(12) United States Patent
Fukano

(10) Patent No.: US 11,894,717 B2
(45) Date of Patent: Feb. 6, 2024

(54) VOLTAGE SETTING SYSTEM FOR POWER DISTRIBUTION

(71) Applicant: KABUSHIKI KAISHA TOYOTA CHUO KENKYUSHO, Nagakute (JP)

(72) Inventor: Tatsuo Fukano, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 165 days.

(21) Appl. No.: 17/554,905

(22) Filed: Dec. 17, 2021

(65) Prior Publication Data

US 2022/0247206 A1 Aug. 4, 2022

(30) Foreign Application Priority Data

Jan. 29, 2021 (JP) ................. 2021-012704

(51) Int. Cl.
*H02J 9/06* (2006.01)
*H02M 1/00* (2006.01)

(52) U.S. Cl.
CPC ............ *H02J 9/061* (2013.01); *H02M 1/007* (2021.05)

(58) Field of Classification Search
CPC ............................... H02J 9/061; H02M 1/007
USPC .......................................................... 307/82
See application file for complete search history.

(56) References Cited

U.S. PATENT DOCUMENTS

2016/0214491 A1 7/2016 Yoko et al.
2022/0126713 A1* 4/2022 Liu .................. H02J 7/143

FOREIGN PATENT DOCUMENTS

| JP | 2003-339118 A | 11/2003 |
| JP | 2012-165615 A | 8/2012 |
| JP | 2015-061439 A | 3/2015 |
| WO | 2015/145971 A1 | 10/2015 |

OTHER PUBLICATIONS

Jan. 31, 2023 Notice of Reasons for Refusal issued in Japanese Patent Application No. 2021-012704.

* cited by examiner

*Primary Examiner* — Michael R. Fin
(74) *Attorney, Agent, or Firm* — Oliff PLC

(57) ABSTRACT

A power supply system including: a DC power trunk line; a demand-side device; a supply-side device that is configured to supply electric power and that is connected with the DC power trunk line to output a DC power to the demand-side device that is connected with the DC power trunk line to receive a DC power, and a calculator that is configured to: set a power-feeding voltage of the supply-side device on a supply side; set a power-receiving voltage of the demand-side device on a demand side; and regard a charge amount or a time integration of current value supplied from the supply-side device to the DC power trunk line, as well as a charge amount or a time integration of current value supplied from the DC power trunk line to the demand-side device, as an amount of power interchange.

20 Claims, 11 Drawing Sheets

VOLTAGE SETTING SYSTEM FOR POWER DISTRIBUTION

CROSS-REFERENCE TO RELATED APPLICATIONS

The present application claims priority from Japanese patent application 2021-12704 filed on Jan. 29, 2021, the entirety of the content of which is hereby incorporated by reference into this application.

BACKGROUND

The present disclosure relates to a power supply system.

With current increased attention of renewable energy leading to reduction of the environmental load, introduction of renewable energy-based power generation systems (for example, a solar power generation system, a wind power system, and a fuel cell system using hydrogen generated by solar energy) is promoted. Introduction of relevant systems, for example, a storage battery system and a hydrogen manufacturing system, used for adjustment of energy in such power generation systems is also promoted. The trend of energy-consuming (demand-side) devices, on the other hand, increases alternating-current motor devices equipped with inverters and direct current devices, such as LED lights, while decreasing the conventionally used alternating-current induction motor devices. There are some reasons for using direct current. The direct current has a smaller ohmic loss and the lower Joule heat than those of the alternating current in a transmission line of an identical sectional area used for a submarine cable. Additionally, in the case of using alternating current, there is a limitation in voltage increase to transmit high power. The direct current having the smaller ohmic loss is more suitable than the alternating current to transmit high power in the form of high current with limitation of voltage increase. Accompanied with such social changes and technological changes, the direct-current power transmission and distribution system becomes more advantageous and more notable than the conventionally used alternating-current power transmission and distribution system.

JP 2003-339118A discloses a power supply system including power supply units and a load unit connected with a direct current bus which direct current flows through. The power supply system described in JP 2003-339118A is provided with a plurality of power supply units. The state of power generation in each power supply unit is changed according to a voltage-related condition set in the power supply unit and is determined without exchanging information on the state of power generation between the plurality of power supply units.

JP 2015-61439A discloses a charging system of an electric vehicle via a direct current bus. The charging system described in JP 2015-61439A receives supply of electric power from a system power source, a power generation system, and a power storage system connected with each other via the direct current bus, in the course of power supply. Each of these systems that supply electric power to the charging system is connected with the direct current bus via a DC-DC converter motor circuit. Charging into the charging system is controlled by controlling the electric current flowing through each DC-DC converter motor circuit.

SUMMARY

JP 2003-339118A discloses the system in which each power supply unit generates electric power according to the condition set in the power supply unit, but does not take into account the operation of the entire system via the direct current bus. JP 2015-61439A discloses the configuration of controlling the power supply to the charging system according to the voltage of a power supply-side system that changes with time, but does not take into account the operation of the entire system, like JP 2003-339118A. It has been demanded to simplify the configuration of a power supply system required for power interchange, such as mutual use of power or electricity trading and to reduce the operation cost of the power supply system.

In order to solve the problems described above, an object of the present disclosure is to simplify the configuration of a system required for power interchange and to reduce the operation cost of the system.

The present disclosure may be implemented by aspects described below.

(1) According to one aspect of the present disclosure, there is provided a power supply system that includes a DC power trunk line; a demand-side device; a supply-side device that is configured to supply electric power and that is connected with the DC power trunk line to output a DC power to the demand-side device that is connected with the DC power trunk line to receive a DC power. A calculator is configured to: set a power-feeding voltage of the supply-side device on a supply side; set a power-receiving voltage of the demand-side device on a demand side; and regard a charge amount or a time integration of current value supplied from the supply-side device to the DC power trunk line, as well as a charge amount or a time integration of current value supplied from the DC power trunk line to the demand-side device, as an amount of power interchange.

In the power supply system of this aspect, the power-feeding voltage of the supply-side device that supplies DC power to the DC power trunk line is set individually on the supply side, and the power-receiving voltage of the demand-side device that receives DC power from the DC power trunk line is set individually on the demand side. The power supply system of this configuration is accordingly different from a conventional power supply system configured to make alternating current flow a trunk line and to perform systematic management of the entire system from a supply side toward a demand side. The power supply system of this aspect enables the power-feeding voltage and the power-receiving voltage to be arbitrarily set according to each supply-side device and each demand-side device connected with the DC power trunk line. The power supply system of this configuration uses DC power and thereby does not need to manage, for example, the frequency and the reactive power.

The power supply system of this aspect calculates the time integration of direct current or the charge amount supplied from the supply-side device to the DC power trunk line, as the amount of power interchange, in place of the amount of electric power. The power supply system of this aspect also calculates the time integration of direct current or the charge amount supplied from the DC power trunk line to the demand-side device, as the amount of power interchange, in place of the amount of electric power. The amount of power interchange more readily calculable than the amount of electric power is used as an indication, in place of the amount of electric power, in the case where a change in voltage of the DC power trunk line is allowed, especially in the case where the voltage of the DC power trunk line varies with time.

In the power supply system of this aspect, each supply-side device or each demand-side device is required to obtain voltage information in a local location of the DC power trunk line at a power feeding point or at a power receiving point and is not necessarily required to obtain information of the other supply-side devices or information of the other demand-side devices. Accordingly, compared with the conventional power supply system, the power supply system of this aspect simplifies the configuration of obtaining the information and the configuration of adjusting the power characteristics.

The power supply system of this aspect uses the amount of power interchange, in place of the amount of electric power, as a newly defined indication that indicates the amount of interchanging power. This enables the amount of power interchange to be readily calculated even in the case of a change in a local location of the DC power trunk line at a power feeding point of each supply-side device or at a power receiving point of each demand-side device.

The power supply system of this aspect enables the value of unit supply amount in power interchange to be adjusted according to the relationship between power supply and power demand by taking into account the economic significance and thereby reduces the operation cost required for power interchange, such as mutual use of power or electricity trading. In the case of operation of the DC power trunk line with a specific voltage width, as the characteristic of the DC power trunk line, the voltage of the DC power trunk line tends to decrease in the state that the power supply is larger than the power demand, compared with the voltage of the DC power trunk line in the state that the power supply is in balance with the power demand. This tendency becomes remarkable especially when a DC-DC converter or the like is used as an input-output device provided between the supply-side device or the demand-side device and the DC power trunk line. In other words, the voltage of the DC power trunk line becomes higher in the case of excess power supply (buyer's market) and becomes lower in the case of excess power demand (seller's market), compared with the voltage of the DC power trunk line in the state that the power supply is in balance with the power demand.

From the viewpoint of the power supply side, the power-feeding voltage is to be increased in the case of excess power supply, while being allowed to decrease in the case of excess power demand. The power supply system of this aspect calculates the amount of power interchange, such as the amount of mutual use of power or the amount of electricity trading, from the charge amount or the time integration of the current value. In the case of excess power supply, the power-feeding voltage is to be increased on the supply side. Accordingly, even when the amount of power interchange, such as the amount of mutual use of power or the amount of electricity trading, is fixed, the real amount of power (=voltage value×time integration of current value) required by the supply side in the state of excess power supply is larger than the real amount of power in the state that the power supply is in balance with the power demand. In the case of excess power demand, on the other hand, the power-feeding voltage is allowed to decrease on the supply side. This decreases the real amount of power (=voltage value×time integration of current value) required by the supply side. Even when the amount of power interchange, such as the amount of mutual use of power or the amount of electricity trading, is fixed, in the case of excess power supply, the real amount of power supply is increased to increase the supply cost (i.e., to lower the value of unit supply amount). In the case of excess power demand, on the other hand, the real amount of power supply is decreased to decrease the supply cost (i.e., to heighten the value of unit supply amount). The similar situation occurs from the viewpoint of the power demand side.

As described above, the power supply system of this aspect enables the value of unit supply amount in power interchange, such as mutual use of power or electricity trading, to be automatically adjusted by taking into account the economic significance. For example, when the power supply is larger than the power demand, the supply side is required to increase the power-feeding voltage, with a view to gaining a chance of power feeding, and supply electric power with consumption of a larger amount of electric power under the condition of a fixed amount of power interchange. When the power demand is larger than the power supply, on the contrary, the demand side automatically decreases the power-receiving voltage, with a view to gaining a chance of power receiving, and receives a small amount of electric power under the condition of a fixed amount of power interchange. This configuration reduces the operation cost required for power interchange, such as mutual use of power or electricity trading. Furthermore, unlike the conventional power supply system that performs systematic management of the entire system from the supply side toward the demand side, the power supply system of this aspect facilitates expansion or reduction of the system and encourages any newcomer or any individual to join in electricity trading.

(2) The power supply system of the above aspect may be configured to set an upper limit voltage of the DC power trunk line that is higher than a time average voltage by 5% or more and a lower limit voltage of the DC power trunk line that is lower than the time average voltage by 5% or more.

Unlike the conventional power supply system that performs systematic management of the entire system from the supply side toward the demand side, the power supply system of this aspect enables electric power to be supplied and received via the DC power trunk line, even in the case of a change in voltage of the DC power trunk line.

(3) The power supply system of the above aspect may comprise a plurality of the supply-side devices; and a plurality of the demand-side devices. The power supply system may be configured to change a point of connection of part of the supply-side devices or part of the demand-side devices with the DC power trunk line or to move the point of connection during power interchange.

Unlike the conventional power supply system that performs systematic management of the entire system from the supply side toward the demand side, the power supply system of this aspect allows for a change in voltage of the DC power trunk line. This configuration enables each of the supply-side devices or each of the demand-side devices to determine the power-feeding voltage and supply electric power or determine the power-receiving voltage and receive a supply of electric power by taking into account the voltage in a local location of the DC power trunk line at a power feeding point or at a power receiving point. This configuration enables the supply-side device or the demand-side device to be mounted to and demounted from the DC power trunk line, or to change or move a power feeding position or a power receiving position. In other words, each supply-side device or each demand-side device may not be necessarily connected with a specific location of a specific DC power trunk line for a specific time period.

(4) The power supply system of the above aspect may comprise a plurality of the supply-side devices; and a plurality of the demand-side devices. At least one of the supply-side devices may be configured to start, stop or change supplying DC power to the DC power trunk line, irrespective of conditions of the other supply-side devices and the demand-side devices, and at least one of the demand-side devices may be configured to start, stop or change receiving a supply of DC power from the DC power trunk line, irrespective of conditions of the supply-side device and the other demand-side devices.

Unlike the conventional power supply system that performs systematic management of the entire system from the supply side toward the demand side, the power supply system of this aspect allows for a change in voltage of the DC power trunk line. This configuration enables each of the supply-side devices to determine the power-feeding voltage and supply electric power by taking into account the voltage in a local location of the DC power trunk line at a power feeding point. This configuration also enables each supply-side device to stop supplying power, change the direct current during power supply, and change the power-feeding voltage even within a time period between a start time and an end time scheduled in advance. Furthermore, this configuration enables each of the demand-side devices to determine the power-receiving voltage and receive a supply of electric power by taking into account the voltage in a local location of the DC power trunk line at a power receiving point. This configuration also enables the demand-side device to stop receiving power, change the direct current during power receiving, and change the power-receiving voltage even within a time period between a start time and an end time scheduled in advance.

(5) The power supply system of the above aspect may comprise a power manager configured to manage an amount of power interchange suppliable from the supply-side device to the DC power trunk line; a time or a time period at or for which DC power is suppliable from the supply-side device to the DC power trunk line; an amount of power interchange actually supplied from the supply-side device to the DC power trunk line; an amount of power interchange receivable from the DC power trunk line to the demand-side device; a time or a time period at or for which the demand-side device requires a supply of DC power from the DC power trunk line; and an amount of power interchange actually supplied from the DC power trunk line to the demand-side device.

(6) The power supply system of the above aspect may comprise a loss calculator configured to calculate a power loss in the power supply system; a plurality of the supply-side devices connected with the DC power trunk line; and a plurality of the demand-side devices connected with the DC power trunk line. The loss calculator may calculate a difference between a total power supplied from all the supply-side devices connected with the DC power trunk line and a total power supplied to all the demand-side devices connected with the DC power trunk line, as the power loss in the power supply system.

In the power supply system, the total power supplied from the respective supply-side devices to the power trunk line and the total power received by the respective demand-side devices from the power trunk line for an arbitrary time period may not be equal to each other, due to the influence of a power transmission loss and a connection loss. The power supply system of this aspect enables a power loss caused by such influence to be regarded as the power loss in the power supply system and readily calculated from the total electric power supplied from the respective supply-side devices and the total electric power received by the respective demand-side devices. This configuration reduces the operation cost of the power supply system.

(7) The power supply system of the above aspect may comprise a plurality of the demand-side devices connected with the DC power trunk line. Each of the demand-side devices may be provided with a power receiving-side voltage setting module configured to set a set voltage in the demand-side device that receives DC power from the DC power trunk line. The power receiving-side voltage setting module may set the set voltage in the demand-side device in a range of a preset lower limit to a preset upper limit. When a preset condition is satisfied, the power receiving-side voltage setting module of at least one specific demand-side device, among the plurality of demand-side devices connected with the DC power trunk line, may set the set voltage in the specific demand-side device to be lower than the lower limit of the set voltages in the other demand-side devices.

When the preset condition is satisfied, the power supply system of this aspect sets the power-receiving voltage of the specific demand-side device to be lower than the lower limit of the set voltages in the other demand-side devices. This configuration enables the specific demand-side device to preferentially receive a supply of electric power over the other demand-side devices or to exclusively receive a supply of electric power. This configuration is achieved by controlling only the specific demand-side device without requiring management of the entire power supply system. This accordingly reduces the operation cost. A facility that needs to preferentially receive a supply of electric power in the case of an emergency, for example, a hospital, a public office, a broadcast station or a communication facility, may be set in advance as the specific demand-side device. This configuration thus enables electric power to be supplied to the specific demand-side device that requires a preferential supply of electric power.

(8) The power supply system of the above aspect may comprise a plurality of the demand-side devices connected with the DC power trunk line. Each of the demand-side devices may be provided with a power receiving-side voltage setting module configured to set a set voltage in the demand-side device that receives DC power from the DC power trunk line. The power supply system may be configured to set a voltage of the DC power trunk line to be higher than a predetermined lower limit voltage. The power receiving-side voltage setting module may set the set voltage in a range of a preset lower limit to a preset upper limit. When a preset condition is satisfied, the power receiving-side voltage setting module of at least one specific demand-side device, among the plurality of demand-side devices connected with the DC power trunk line, may set the set voltage in the specific demand-side device to be lower than the predetermined lower limit voltage of the DC power trunk line which the specific demand-side device is connected with.

When the preset condition is satisfied, the power supply system of this aspect sets the power-receiving voltage of the specific demand-side device to be lower than the lower limit voltage set in the DC power trunk line. This configuration enables the specific demand-side device to preferentially receive a supply of electric power over the other demand-side devices or to exclusively receive a supply of electric power. This configuration is achieved by controlling only the specific demand-side device without requiring management of the entire power supply system. This accordingly reduces the operation cost. A facility that needs to preferentially receive a supply of electric power in the case of an emergency, for example, a hospital, a public office, a broadcast station or a communication facility, may be set in advance as the specific demand-side device. This configuration thus enables electric power to be supplied to the specific demand-side device that requires a preferential supply of electric power.

(9) The power supply system of the above aspect may comprise a plurality of the supply-side devices connected with the DC power trunk line; and a plurality of the demand-side devices connected with the DC power trunk line. Each of the supply-side devices may be provided with a power feeding-side voltage setting module configured to set a set voltage in the supply-side device that supplies DC power to the DC power trunk line, and each of the demand-side devices may be provided with a power receiving-side voltage setting module configured to set a set voltage in the demand-side device that receives DC power from the DC power trunk line. The power feeding-side voltage setting module may set the set voltage in the supply-side device in a range of a preset lower limit to a preset upper limit, and the power receiving-side voltage setting module may set the set voltage in the demand-side device in a range of a preset lower limit to a preset upper limit. When a preset condition is satisfied, the power feeding-side voltage setting module of at least one specific supply-side device, among the plurality of supply-side devices connected with the DC power trunk line and the power receiving-side voltage setting module of at least one specific demand-side device, among the plurality of demand-side devices connected with the DC power trunk line, may respectively set the set voltage in the specific supply-side device and the set voltage in the specific demand-side device to be lower than the lower limit of the set voltages in the other demand-side devices.

When the preset condition is satisfied, the power supply system of this aspect sets the power-receiving voltage of the specific demand-side device and the power-feeding voltage of the specific supply-side device to be lower than the lower limit of the set voltages in the other demand-side devices. This configuration enables the specific demand-side device to exclusively receive a supply of electric power from the specific supply-side device. This configuration is achieved by controlling only the set voltages in the specific supply-side device and the specific demand-side device without requiring management of the entire power supply system. This accordingly reduces the operation cost. A facility that needs to preferentially receive a supply of electric power in the case of an emergency, for example, a hospital, a public office, a broadcast station or a communication facility, may be set in advance as the specific demand-side device. This configuration thus enables electric power to be supplied to the specific demand-side device that requires a preferential supply of electric power.

For example, an emergency response facility is discriminated from a general facility in terms of service of the DC power trunk line. In the terms of service, a lower limit value in a set voltage range of a demand-side device in the emergency response facility is set to be lower than a lower limit value in a set voltage range of a demand-side device in the general facility. In the case of an emergency, for example, a large-scale disaster or a wide-area disaster, this configuration causes the voltage of the DC power trunk line to be lower than the lower limit value in the set voltage range of the demand-side device in the general facility and to be higher than the lower limit value in the set voltage range of the demand-side device in the emergency response facility. As a result, the power supply system of this aspect enables electric power to be selectively and promptly supplied to the emergency response facility without requiring individual controls of the respective facilities. The specific demand-side device is allowed to receive a supply of electric power from even a supply-side device generating a small amount of electric power by reducing the voltage of the DC power trunk line. Examples of the emergency response facility include a hospital, a public office, a broadcast station and a communication facility. The lower limit value in the set voltage range of each demand-side device may be set by an input-output device or a switch provided in the demand-side device.

(10) The power supply system of the above aspect may comprise a plurality of the supply-side devices connected with the DC power trunk line; and a plurality of the demand-side devices connected with the DC power trunk line. The power supply system may be configured to set a voltage of the DC power trunk line to be higher than a predetermined lower limit voltage. Each of the supply-side devices may be provided with a power feeding-side voltage setting module configured to set a set voltage in the supply-side device that supplies DC power to the DC power trunk line, and each of the demand-side devices may be provided with a power receiving-side voltage setting module configured to set a set voltage in the demand-side device that receives DC power from the DC power trunk line. The power feeding-side voltage setting module may set the set voltage in the supply-side device in a range of a preset lower limit to a preset upper limit, and the power receiving-side voltage setting module may set the set voltage in the demand-side device in a range of a preset lower limit to a preset upper limit. When a preset condition is satisfied, the power feeding-side voltage setting module of at least one specific supply-side device, among the plurality of supply-side devices connected with the DC power trunk line and the power receiving-side voltage setting module of at least one specific demand-side device, among the plurality of demand-side devices connected with the DC power trunk line, may respectively set the set voltage in the specific supply-side device and the set voltage in the specific demand-side device to be lower than the predetermined lower limit voltage of the DC power trunk line.

When the preset condition is satisfied, the power supply system of this aspect sets the power-receiving voltage of the specific demand-side device and the power-feeding voltage of the specific supply-side device to be lower than the lower limit voltage set in the DC power trunk line. This configuration enables the specific demand-side device to exclusively receive a supply of electric power from the specific supply-side device. This configuration is achieved by controlling only the set voltages in the specific supply-side device and the specific demand-side device without requiring management of the entire power supply system. This accordingly reduces the operation cost. A facility that needs to preferentially receive a supply of electric power in the case of an emergency, for example, a hospital, a public office, a broadcast station or a communication facility, may be set in advance as the specific demand-side device. This configuration thus enables electric power to be supplied to the specific demand-side device that requires a preferential supply of electric power.

For example, an emergency response facility is discriminated from a general facility in terms of service of the DC power trunk line. In the terms of service, a lower limit value in a set voltage range of a demand-side device in the emergency response facility is set to be lower than a lower limit value in a set voltage range of a demand-side device in the general facility. In the case of an emergency, for example, a large-scale disaster or a wide-area disaster, this configuration causes the voltage of the DC power trunk line to be lower than the lower limit value in the set voltage range of the demand-side device in the general facility and to be higher than the lower limit value in the set voltage range of the demand-side device in the emergency response facility. As a result, the power supply system of this aspect enables electric power to be selectively and promptly supplied to the emergency response facility without requiring individual controls of the respective facilities. The specific demand-side device is allowed to receive a supply of electric power from even a supply-side device generating a small amount of electric power by reducing the voltage of the DC power trunk line. Examples of the emergency response facility include a hospital, a public office, a broadcast station and a communication facility. The lower limit value in the set voltage range of each demand-side device may be set by an input-output device or a switch provided in the demand-side device.

The present disclosure may be implemented by a variety of aspects: for example, a system configured to supply electric power, a power supply system, a power distribution system, a power supply method, a method of controlling power supply, a computer program executed to implement any of such systems and such methods, a server device configured to distribute this computer program, and a non-transitory storage medium that stores this computer program.

DETAILED DESCRIPTION OF EMBODIMENTS

First Embodiment

Figure 1:
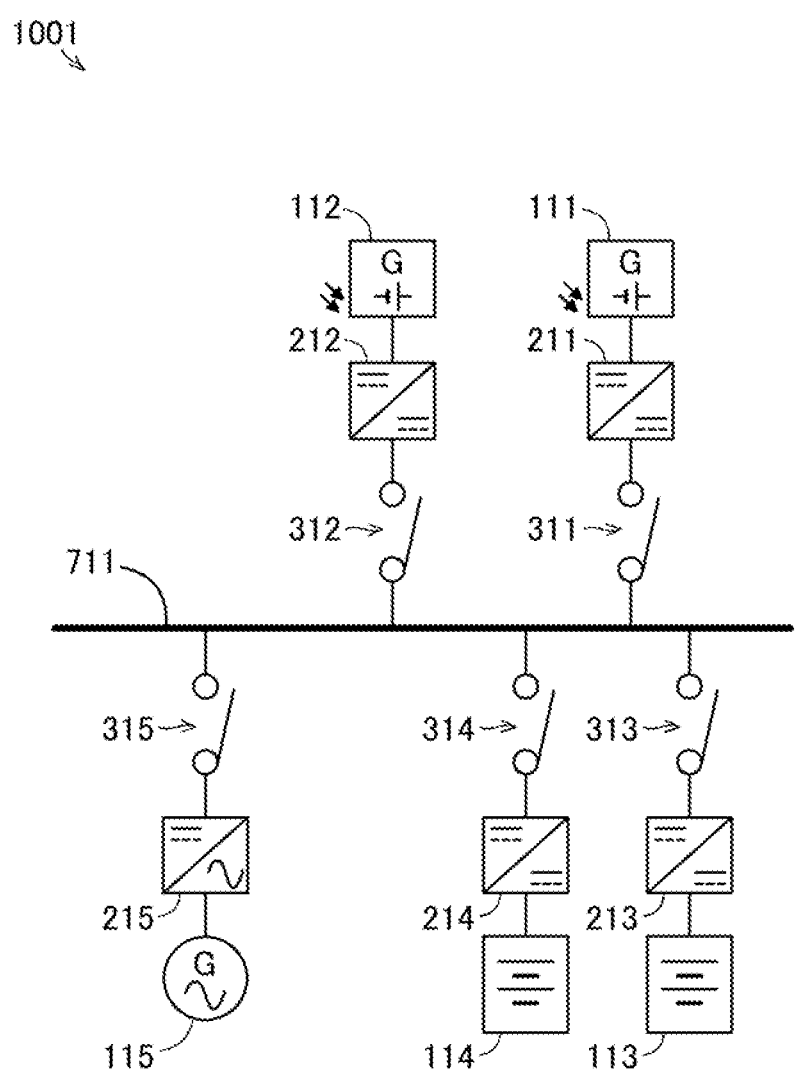
FIG. 1 is a schematic block diagram illustrating a power supply system according to a first embodiment of the present disclosure.

FIG. 1 is a schematic block diagram illustrating a power supply system 1001 according to a first embodiment of the present disclosure. In the power supply system 1001, a plurality of supply-side devices to supply electric power are connected with a plurality of demand-side devices to require electric power via a trunk line which direct current flows through.

As shown in FIG. 1, the power supply system 1001 includes a first solar panel group (supply-side device) 111 and a second solar panel group (supply-side device) 112 respectively comprised of a plurality of solar panels; a DC-DC converter (power feeding-side voltage setting module, supply-side calculator) 211 configured to convert a DC power supplied by the first solar panel group 111; a switch 311 configured to connect and disconnect the DC-DC converter 211 with and from a trunk line (DC power trunk line) 711; a DC-DC converter (power feeding-side voltage setting module, supply-side calculator) 212 configured to convert a DC power supplied by the second solar panel group 112; a switch 312 configured to connect and disconnect the DC-DC converter 212 with and from the trunk line 711; an on-board storage battery (demand-side device) 113 mounted on an electric vehicle; a DC-DC converter (power receiving-side voltage setting module, demand-side calculator) 213 configured to convert a DC power required by the on-board storage battery 113; a switch 313 configured to connect and disconnect the DC-DC converter 213 with and from the trunk line 711; a storage battery for residential use (demand-side device) 114 attached to a house to supply electric power to the house; a DC-DC converter (power receiving-side voltage setting module, demand-side calculator) 214 configured to convert a DC power that is to be supplied to the storage battery for residential use 114; a switch 314 configured to connect and disconnect the DC-DC converter 214 with and from the trunk line 711; a gas turbine generator (supply-side device) 115 configured to generate an AC power; an AC-DC converter (power feeding-side voltage setting module, supply-side calculator) 215 configured to convert the AC power generated by the gas turbine generator 115 into a DC power; and a switch 315 configured to connect and disconnect the AC-DC converter 215 with and from the trunk line 711.

The first solar panel group 111 and the second solar panel group 112 are connected with the trunk line 711 via the DC-DC converters 211 and 212 and the switches 311 and 312 to supply a DC power to the trunk line 711. The on-board storage battery 113 and the storage battery for residential use 114 are connected with the trunk line 711 via the DC-DC converters 213 and 214 and the switches 313 and 314 to require a DC power from the trunk line 711.

The DC-DC converter 211 sets a voltage of the DC power to be supplied from the first solar panel group 111 to the trunk line 711. Similarly, the DC-DC converter 212 sets a voltage of the DC power to be supplied from the second solar panel group 112 to the trunk line 711. The AC-DC converter 215 sets a voltage of the DC power to be supplied from the gas turbine generator 115 to the trunk line 711. According to the embodiment, these voltages are set by the respective converters 211, 212 and 215 through operations of operation units respectively attached to the DC-DC converter 211, the DC-DC converter 212, and the AC-DC converter 215. Each of the DC-DC converter 211, the DC-DC converter 212, and the AC-DC converter 215 also detects a current value of the DC power supplied to the trunk line 711 and a power-feeding time for which the DC power is supplied to the trunk line 711.

The DC-DC converter 211 calculates a time integration of direct current from the detected current value of the DC power and the power-feeding time for which the DC power is supplied from the first solar panel group 111 to the trunk line 711, as an amount of power interchange from the first solar panel group 111. The amount of power interchange according to the embodiment is a newly defined indication.

The DC-DC converter 212 calculates a time integration of direct current from the detected current value of the DC power and the power-feeding time for which the DC power is supplied from the second solar panel group 112 to the trunk line 711, as an amount of power interchange from the second solar panel group 112. Similarly the AC-DC converter 215 calculates a time integration of direct current from the detected current value of the DC power and the power-feeding time for which the DC power is supplied from the gas turbine generator 115 to the trunk line 711, as an amount of power interchange from the gas turbine generator 115.

The DC-DC converter 213 sets a voltage of the DC power which the on-board storage battery 113 requires from the trunk line 711. Similarly, the DC-DC converter 214 sets a voltage of the DC power which the storage battery for residential use 114 requires from the trunk line 711. According to the embodiment, these voltages are set by the respective DC-DC converters 213 and 214 through operations of operation units respectively attached to the DC-DC converters 213 and 214. Each of the DC-DC converters 213 and 214 also detects a current value of the DC power received from the trunk line 711 and a power-receiving time for which the DC power is supplied from the trunk line 711.

The DC-DC converter 213 calculates a time integration of direct current from the detected current value of the DC power and the power-receiving time for which the on-board storage battery 113 receives the supply of DC power from the trunk line 711, as an amount of power interchange to the on-board storage battery 113. Similarly, the DC-DC converter 214 calculates a time integration of direct current from the detected current value of the DC power and the power-receiving time for which the storage battery for residential use 114 receives the supply of DC power from the trunk line 711, as an amount of power interchange to the storage battery for residential use 114.

Figure 2:
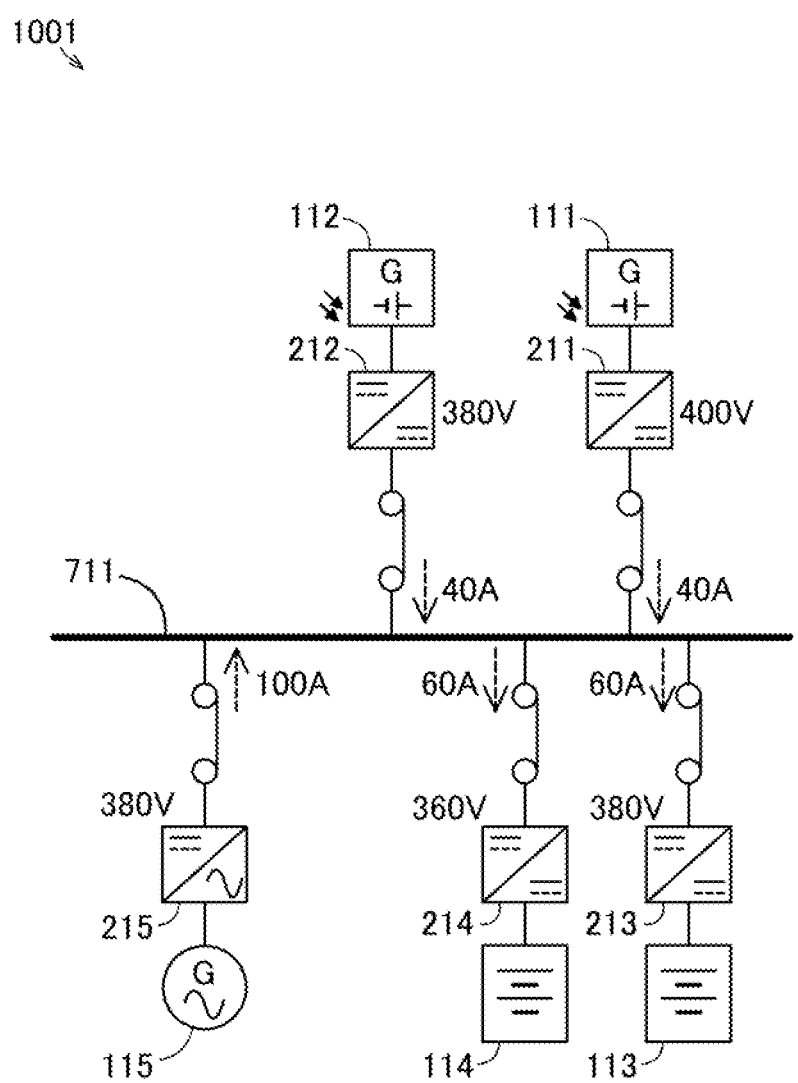
FIG. 2 is an explanatory diagram illustrating one exemplified state in which a DC power is supplied via a trunk line in the power supply system.

FIG. 2 is an explanatory diagram illustrating one exemplified state in which the DC power is supplied via the trunk line 711 in the power supply system 1001. In the state of FIG. 2, with regard to the respective supply-side devices, the set voltage of the DC-DC converter 212 and the DC-side set voltage of the AC-DC converter 215 are 380 V (volts), and the set voltage of the DC-DC converter 211 is 400 V. With regard to the respective demand-side devices, the set voltage of the DC-DC converter 213 is 380 V, and the set voltage of the DC-DC converter 214 is 360 V.

As shown in FIG. 2, the first solar panel group 111 seeks to supply a DC power of 40 A (amperes) as a current value to the trunk line 711. The second solar panel group 112 seeks to supply a DC power of 40 A to the trunk line 711. The gas turbine generator 115 seeks to supply a DC power of 100 A to the trunk line 711. The on-board storage battery 113 seeks to receive a supply of DC power of 60 A from the trunk line 711. The storage battery for residential use 114 seeks to receive a supply of DC power of 60 A from the trunk line 711.

In the state of FIG. 2, among the first solar panel group 111, the second solar panel group 112 and the gas turbine generator 115 configured to supply DC power to the trunk line 711, the first solar panel group 111 having the highest set voltage becomes predominant in the course of power feeding. Between the on-board storage battery 113 and the storage battery for residential use 114 configured to receive the supply of DC power from the trunk line 711, on the other hand, the storage battery for residential use 114 having the lower set voltage becomes predominant in the course of power receiving.

In this case, the following phenomenon occurs, since the total amount of power-receiving current on the demand side is smaller than the total amount of power-feeding current on the supply side. On the power receiving side, the storage battery for residential use 114 receives a DC power of 60 A from the trunk line 711, and the on-board storage battery 113 receives a DC power of 60 A from the trunk line 711. On the power feeding side, on the other hand, the first solar panel group 111 having the highest set voltage is predominant in the course of power feeding, so that a DC power of 40 A is preferentially supplied from the first solar panel group 111 to the trunk line 711. In the meantime, a DC power of total 80 A is supplied from the second solar panel group 112 and the gas turbine generator 115 having the same set voltages and the lower priorities than the first solar panel group 111 to the trunk line 711.

It is here assumed that the second solar panel group 112 supplies direct current of 40 A to the trunk line 711. In this case, the first solar panel group 111 supplies a power of 16.0 kW (=400 V×40 A) as a power value, the second solar panel 112 supplies a power of 15.2 kW (=380 V×40 A), and the gas turbine generator 115 supplies a power of 15.2 kW (=380 V×40 A). The first solar panel group 111 does not lose a chance of supplying electric power. The first solar panel group 111, however, requires a surplus power of 0.8 kW (=16.0 kW−15.2 kW) to supply direct current of 40 A to the trunk line 711, while the second solar panel group 112 requires the power of 15.2 kW to supply the same direct current of 40 A to the trunk line 711. In the actual state, the second solar panel group 112 competes with the gas turbine generator 115 in having a chance of supplying electric power and is thus not allowed to unilaterally supply the direct current of 40 A like the above assumption. In order to prevent the second solar panel group 112 from losing a chance of supplying electric power, the set voltage of the DC-DC converter 212 for the second solar panel group 112 is required to be higher than the DC-side set voltage of the AC-DC converter 215 for the gas turbine generator 115.

Figure 3:
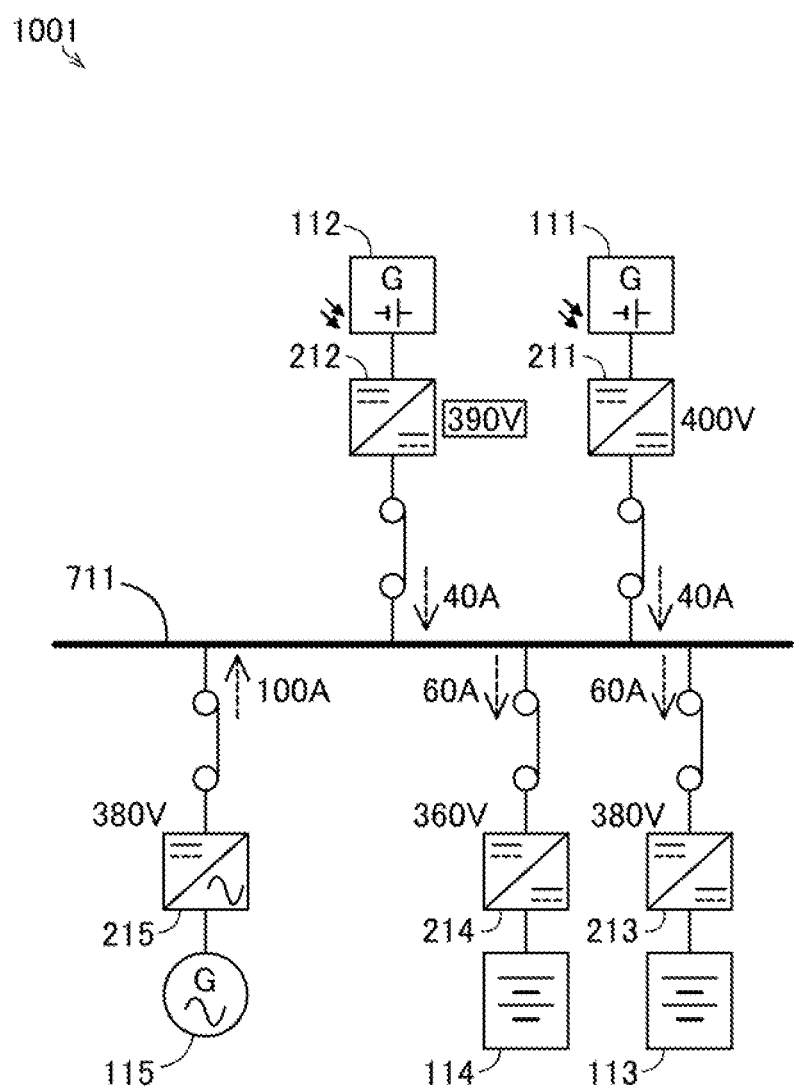
FIG. 3 is an explanatory diagram illustrating the power supply system with part of set voltages changed from the state of FIG. 2.

FIG. 3 is an explanatory diagram illustrating the power supply system 1001 with part of the set voltages changed from the state of FIG. 2. In the state of FIG. 3, the set voltage of the DC-DC converter 212 connected with the second solar panel group 112 is increased from 380 V to 390 V. As a result, the set voltage (390 V) of the DC-DC converter 212 connected with the second solar panel group 112 is higher than the DC-side set voltage (380 V) of the AC-DC converter 215 connected with the gas turbine generator 115. The second solar panel group 112 accordingly does not compete with the gas turbine generator 115 but is allowed to preferentially supply the DC power. Since the set voltage of the DC-DC converter 212 connected with the second solar panel group 112 is increased from 380 V to 390 V, however, the second solar panel group 112 supplies a power of 15.6 kW (=390 V×40 A). As a result, compared with in the state of FIG. 2, the second solar panel group 112 requires a surplus power of 0.4 kW (=15.6 kW−15.2 kW) to supply the direct current of 40 A to the trunk line 711. This means that the second solar panel group 112 consumes an additional power of 0.4 kW to supply the same direct current, with a view to certainly having a chance of supplying electric power. A value of (amount of power interchange)/(amount of electric power required for the amount of power interchange) is used as an indication of the unit price of power interchange. Consuming the additional power for the purpose of certainly having a chance of supplying electric power means reducing the unit price of power interchange, i.e., reducing the power value, for the purpose of certainly having a chance of supplying electric power. As a result, the power supply system 1001 of the embodiment automatically achieves a balance between the chance of supplying electric power and the power value by taking into account the economic significance.

Comparative Example

Figure 4:
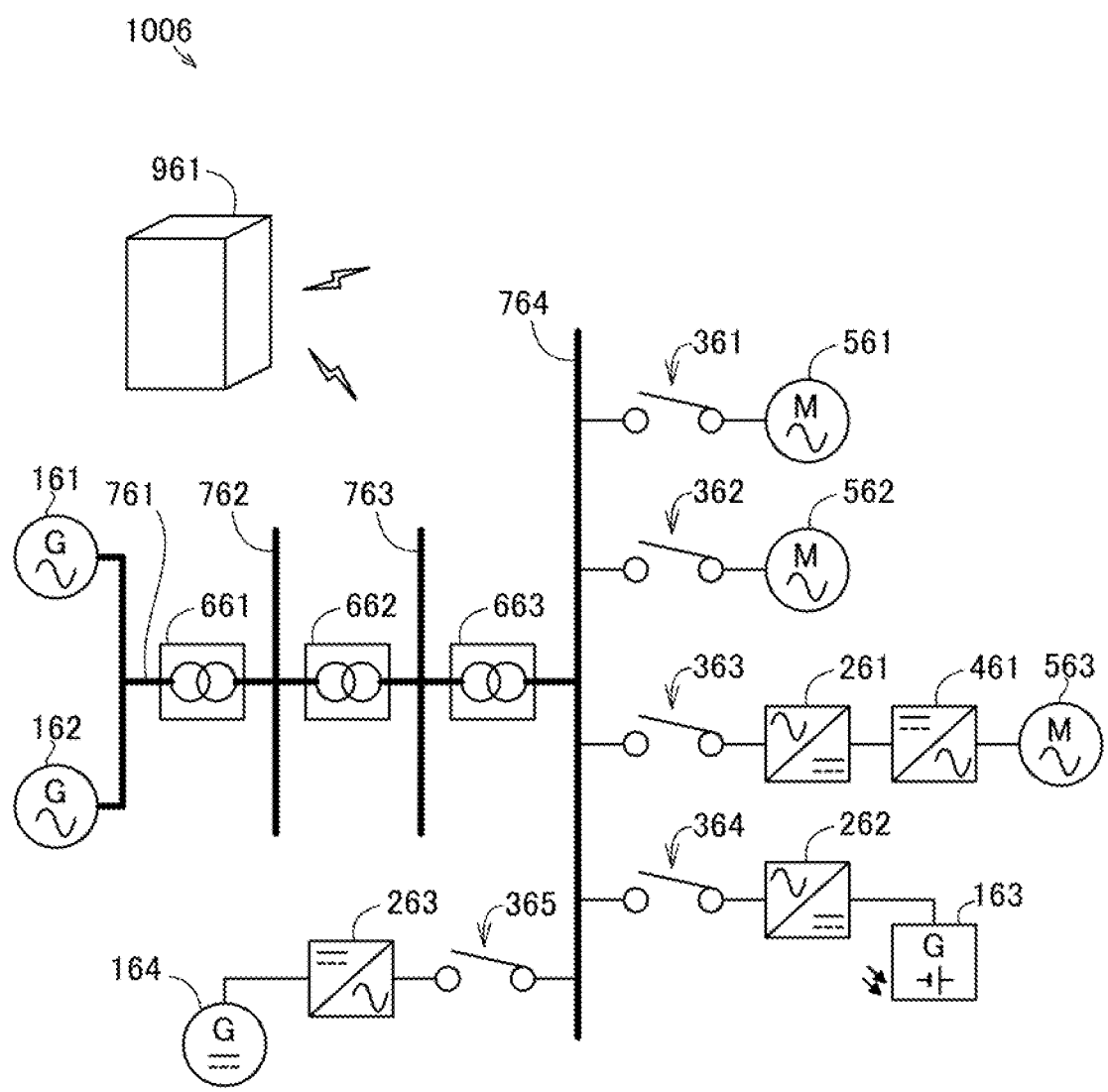
FIG. 4 is a schematic block diagram illustrating a power supply system according to a comparative example.

FIG. 4 is a schematic block diagram illustrating a power supply system 1006 according to a comparative example. The following describes the configuration, the control and the like different from those of the first embodiment, while omitting the description of the configuration, the control and the like identical with those of the first embodiment. The power supply system 1006 supplies electric power by using alternating current flowing through respective power transmission systems.

As shown in FIG. 4, the power supply system 1006 includes a power manager 961 configured to manage and control the entire power supply control and the like of the power supply system 1006; a thermal power plant 161; a hydraulic power plant 162; an ultra-high voltage substation 661, a primary substation 662 and a distributing substation 663 configured to change the voltage; an ultra-high voltage power transmission system 761 configured to supply an AC power generated by the thermal power plant 161 and the hydraulic power plant 162 to the ultra-high voltage substation 661; a primary power transmission system 762 configured to supply the AC power having the voltage changed by the ultra-high voltage substation 661 to the primary substation 662; a secondary power transmission system 763 configured to supply the AC power having the voltage changed by the primary substation 662 to the distributing substation 663; a distribution power system 764 configured to make the flow of the AC power supplied from the distributing substation 663; a solar power plant 163; a DC-AC inverter 262 configured to convert a DC power generated by the solar power plant 163 into an AC power; a switch 364 configured to connect and disconnect the solar power plant 163 with and from the power distribution system 764; a fuel cell power plant 164; a DC-AC inverter 263 configured to convert a DC power generated by the fuel cell power plant 164 into an AC power; a switch 365 configured to connect and disconnect the fuel cell power plant 164 with and from the power distribution system 764; dielectric motor devices 561 and 562; a switch 361 configured to connect and disconnect the dielectric motor device 561 with and from the power distribution system 764; a switch 362 configured to connect and disconnect the dielectric motor device 562 with and from the power distribution system 764; an AC motor device 563; a switch 363 configured to connect and disconnect the AC motor device 563 with and from the power distribution system 764; an AC-DC converter 261 configured to convert an AC power supplied from the power distribution system 764 into a DC power; and an inverter 461 configured to supply the DC power converted by the AC-DC converter 261 into the AC motor device 563.

In the comparative example, the voltage of the AC power supplied from the thermal power plant 161 and the hydraulic power plant 162 is lowered whenever the AC power passes through the substation, i.e., the ultra-high voltage substation 661, the primary substation 662 or the distributing substation 663. Additionally, the voltage may be lowered via a non-illustrated transformer in the pathway from the power distribution system 764 to each device (for example, the dielectric motor device 561 or 562).

The power manager 961 that is a general power transmission and distribution operator (for example, an electric power company) controls the ultra-high voltage power transmission system 761, the primary power transmission system 762, the secondary power transmission system 763, and the power distribution system 764. More specifically, the power manager 961 controls the voltage of each of the systems 761 to 764 and the apparent power and the frequency of alternating current flowing through each of the systems 761 to 764. For example, when the standard voltage of the power distribution system 764 is determined to be 100 V by an administrator, such as the nation, the power manager 961 is required to control the set voltage of the power distribution system 764 in a range of 101 V±6 V. When the standard voltage of the power distribution system 764 is determined to be 200 V, the power manager 961 is required to control the set voltage of the power distribution system 764 in a range of 202 V±20 V. The power manager 961 is required to keep the apparent power of alternating current supplied from each of the systems 761 to 764 to each demand-side device in the predetermined voltage range and make the frequency of the AC power equal to a predetermined standard frequency (50 Hz or 60 Hz). Accordingly, in the comparative example, the power manager 961 is required to collectively manage power generation, power transformation, power transmission, power distribution and the like in the power supply system 1006 by controlling the respective systems 761 to 764. Moreover, the power manager 961 is required to maintain the electric power quality, while aiming to achieve the high safety, the high energy efficiency, the stable supply of electric power and the low cost of electric power in the power supply system 1006.

Unlike the power supply system 1006 of the comparative example, in the power supply system 1001 of the first embodiment, the second solar panel group 112 is connected with the trunk line 711 which the direct current flows through, to supply the DC power to the trunk line 711. The voltage of the DC power supplied from the second solar panel group 112 to the trunk line 711 is set by the DC-DC converter 212. The on-board storage battery 113 is connected with the trunk line 711 which the direct current flows through, to receive the supply of DC power from the trunk line 711. The voltage of the DC power which the on-board storage battery 113 requires from the trunk line 711 is set by the DC-DC converter 213. Accordingly, the power supply system 1001 of the first embodiment allows for a change of the trunk line voltage and causes at least the set voltage of the DC-DC converter 212 to be set according to the voltage in a local location at a power feeding point where the supply-side device is connected with the trunk line 711. The power supply system 1001 of the first embodiment also allows for a change of the trunk line voltage and causes at least the set voltage of the DC-DC converter 213 to be set according to the voltage in a local location at a power receiving point where the demand-side device is connected with the trunk line 711.

The power supply system 1001 of the first embodiment enables the set voltage in each supply-side device and the set voltage in each demand-side device to be freely set, independently of, for example, the power manager 961 that manages the entire power supply system 1006 of the comparative example. Accordingly, the power supply system 1001 of the first embodiment does not require any equipment or manager, such as the power manager 961 included in the power supply system 1006 of the comparative example to manage the entire power supply system 1006. Furthermore, in the power supply system 1001 of the first embodiment, each supply-side device or each demand-side device determines the amount of power interchange by using information on the time integration of a required direct current without requiring to obtain information on the other supply-side devices or information on the other demand-side devices. This simplifies the configuration of the power supply system 1001. As a result, this facilitates expansion or reduction of the power supply system 1001 and encourages any newcomer or any individual to join in electricity trading. In the power supply system 1001, the set voltage in each supply-side device is set according to the requirement for electric power to be supplied, and the set voltage in each demand-side device is set according to the requirement of electric power to be received. This adjusts the value of unit supply amount in power interchange in the power supply system 1001 by taking into account the economic significance. This configuration accordingly reduces the operation cost of the power supply system 1001 required for power interchange, such as mutual use of power or electricity trading.

Second Embodiment

Figure 5:
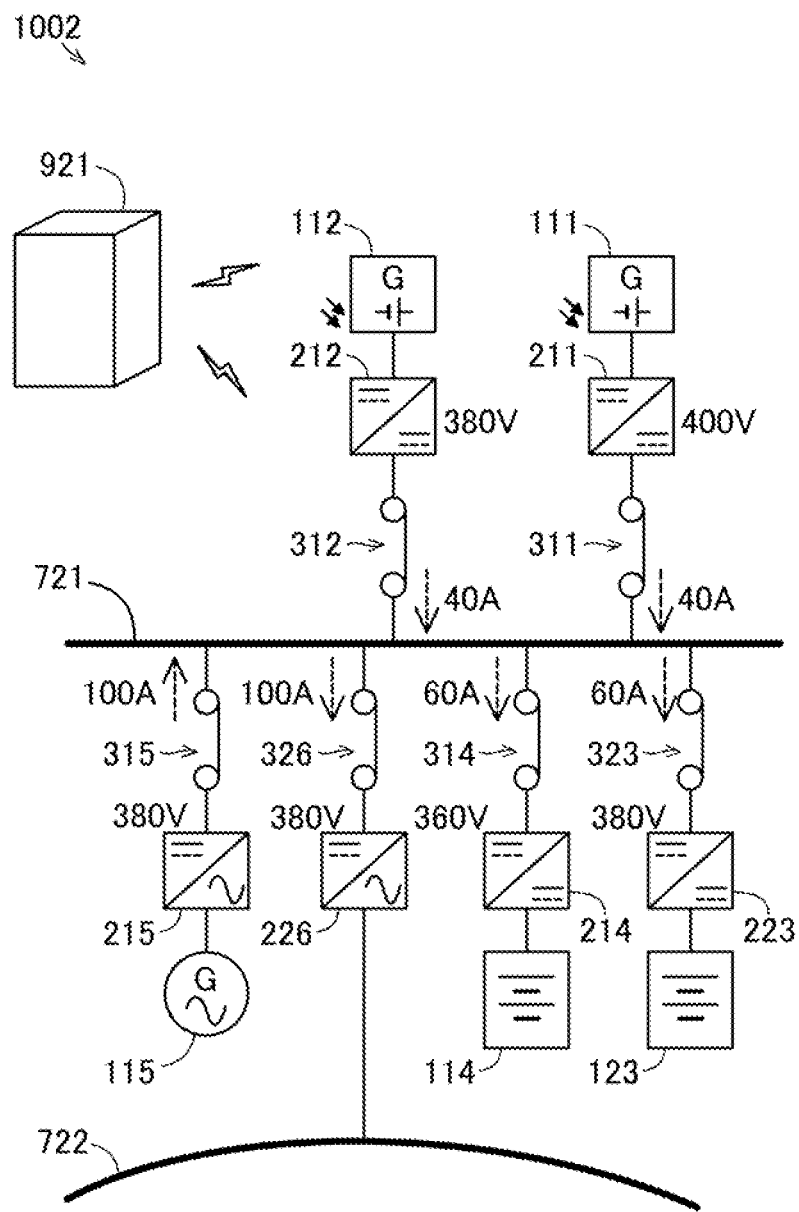
FIG. 5 is a schematic block diagram illustrating a power supply system according to a second embodiment.

FIG. 5 is a schematic block diagram illustrating a power supply system 1002 according to a second embodiment. The power supply system 1002 of the second embodiment differs from the power supply system 1001 of the first embodiment by the following three points:

A storage battery for hospital use 123 is connected with a trunk line 721, in place of the on-board storage battery 113 of the first embodiment;

The trunk line 721 is connected with an AC power line 722; and

The power supply system 1002 includes a loss calculator 921 configured to collect information on respective demand-side devices and information on respective supply-side devices and calculate an amount of power loss in the power supply system 1002.

The other configuration of the power supply system 1002 of the second embodiment is similar to that of the power supply system 1001 of the first embodiment. The following describes the configuration and the like different from those of the first embodiment, while omitting the description of the configuration and the like identical with those of the first embodiment.

The loss calculator 921 calculates a difference between a total power supplied from all the supply-side devices connected with the trunk line 721 and a total power supplied to all the demand-side devices connected with the trunk line 721, as a power loss of the power supply system 1002. In the power supply system 1002, the electric power supplied from the supply-side devices and the electric power supplied to the demand-side devices for an arbitrary time period may not be equal to each other, due to the influence of a power transmission loss and a connection loss. According to the second embodiment, the difference between the total supply power and the total demand power is regarded as the power loss of the power supply system 1002. This configuration enables the power loss to be readily calculated and reduces the operation cost of the power supply system 1002.

As shown in FIG. 5, the power supply system 1002 includes a storage battery for hospital use (demand-side device) 123 attached to a hospital to supply electric power to the hospital; a DC-DC converter (power receiving-side voltage setting module, demand-side calculator) 223 configured to convert a DC power that is to be supplied to the storage battery for hospital use 123; a switch 323 configured to connect and disconnect the DC-DC converter 223 with and from the trunk line 721; an AC power line 722 which alternating current flows through; a DC-AC inverter (power receiving-side voltage setting module, demand-side calculator) 226 configured to convert a DC power into an AC power that is to be supplied to the AC power line 722; and a switch 326 configured to connect and disconnect the DC-AC inverter 226 with the trunk line 721.

In the power supply system 1002 of the second embodiment, an upper limit voltage and a lower limit voltage of the trunk line 721 are set to be 420 V and 360 V respectively. According to the second embodiment, the set voltage in each of the supply-side devices and each of the demand-side devices is thereby to be set in a range of not lower than 360 V and not higher than 420 V. Alternatively, a voltage setting module of each supply-side device or each demand-side device may be configured not to operate the supply-side device or the demand-side device with a voltage of lower than 360 V or with a voltage of higher than 420 V.

The DC power supplied from or required by each of the devices connected with the trunk line 721 and the set voltage for each of the devices are shown in FIG. 5, like the first embodiment shown in FIGS. 2 and 3. As shown in FIG. 5, the set voltage of the DC-DC converter 211 is 400 V; the set voltage of the DC-DC converter 212 is 380 V; the set voltage of the DC-DC converter 214 is 360 V; and the DC-side set voltage of the AC-DC converter 215 is 380 V, like the first embodiment shown in the state of FIG. 2. Additionally, the set voltage of the DC-DC converter 223 is 380 V; and the DC-side set voltage of the DC-AC inverter 226 is 380 V.

In the state of FIG. 5, the first solar panel group 111 seeks to supply a DC power of 40 A as a current value to the trunk line 721. The second solar panel group 112 seeks to supply a DC power of 40 A to the trunk line 721. The gas turbine generator 115 seeks to supply a DC power of 100 A to the trunk line 721. The storage battery for residential use 114 seeks to receive a supply of DC power of 60 A from the trunk line 721. The AC power line 722 seeks to receive a supply of DC power of 100 A from the trunk line 721. The storage battery for hospital use 123 seeks to receive a supply of DC power of 60 A from the trunk line 721.

In the state of FIG. 5, among the first solar panel group 111, the second solar panel group 112 and the gas turbine generator 115 configured to supply DC power to the trunk line 721, the first solar panel group 111 having the highest set voltage becomes predominant in the course of power feeding. Among the storage battery for hospital use 123, the storage battery for residential use 114 and the AC power line 722 configured to receive the supply of DC power from the trunk line 721, on the other hand, the storage battery for residential use 114 having the lowest set voltage becomes predominant in the course of power receiving.

In this case, the following phenomenon occurs, since the total amount of power-feeding current on the supply side is smaller than the total amount of power-receiving current on the demand side. On the power feeding side, the first solar panel group 111 supplies a DC power of 40 A to the trunk line 721; the second solar panel group 112 supplies a DC power of 40 A to the trunk line 721; and the gas turbine generator 115 supplies a DC power of 100 A to the trunk line 721. On the power receiving side, on the other hand, the storage battery for residential use 114 having the lowest set voltage is predominant in the course of power receiving and thus preferentially receives the supply of a DC power of 60 A from the trunk line 721. In the meantime, the storage battery for hospital use 123 and the AC power line 722 having the same set voltages and the lower priorities receive the supply of a DC power of total 120 A from the trunk line 721.

It is here assumed that the storage battery for hospital use 123 receives the supply of direct current of 60 A from the trunk line 721. In this case, the storage battery for residential use 114 receives a power of 21.6 kW (=360 V×60 A) as a power value. The storage battery for hospital use 123 receives a power of 22.8 kW (=380 V×60 A), and the AC power line 722 receives a power of 22.8 kW (=380 V×60 A). The storage battery for residential use 114 does not lose a chance of receiving a supply of electric power. The storage battery for residential use 114, however, has a power loss of 1.2 kw (=22.8 kW−21.6 kW) to receive the supply of direct current of 60 A from the trunk line 721, while the storage battery for hospital use 123 receives the power of 22.8 kW to receive the supply of the same direct current of 60 A from the trunk line 721. In the actual state, the storage battery for hospital use 123 competes with the AC power line 722 in having a chance of receiving a supply of electric power and is thus not allowed to unilaterally receive the supply of the direct current of 60 A like the above assumption. In order to prevent the storage battery for hospital use 123 from losing a chance of receiving a supply of electric power, the set voltage of the DC-DC converter 223 for the storage battery for hospital use 123 is required to be lower than the DC-side set voltage of the DC-AC inverter 226 for the AC power line 722.

In the power supply system 1002 shown in FIG. 5, on the assumption that the storage battery for hospital use 123 receives the supply of direct current of 60 A from the trunk line 721, the total electric power received by all the demand-side devices connected with the trunk line 721 is 67.2 kW (=21.6 kW+22.8 kW+22.8 kW). The total electric power supplied by all the supply-side devices connected with the trunk line 721 is, on the other hand, 69.2 kW (=16.0 kW+15.2 kW+38.0 kW). Accordingly, the loss calculator 921 of the second embodiment calculates a power loss of 2.0 kW (=69.2 kW−67.2 kW) in the power supply system 1002.

Figure 6:
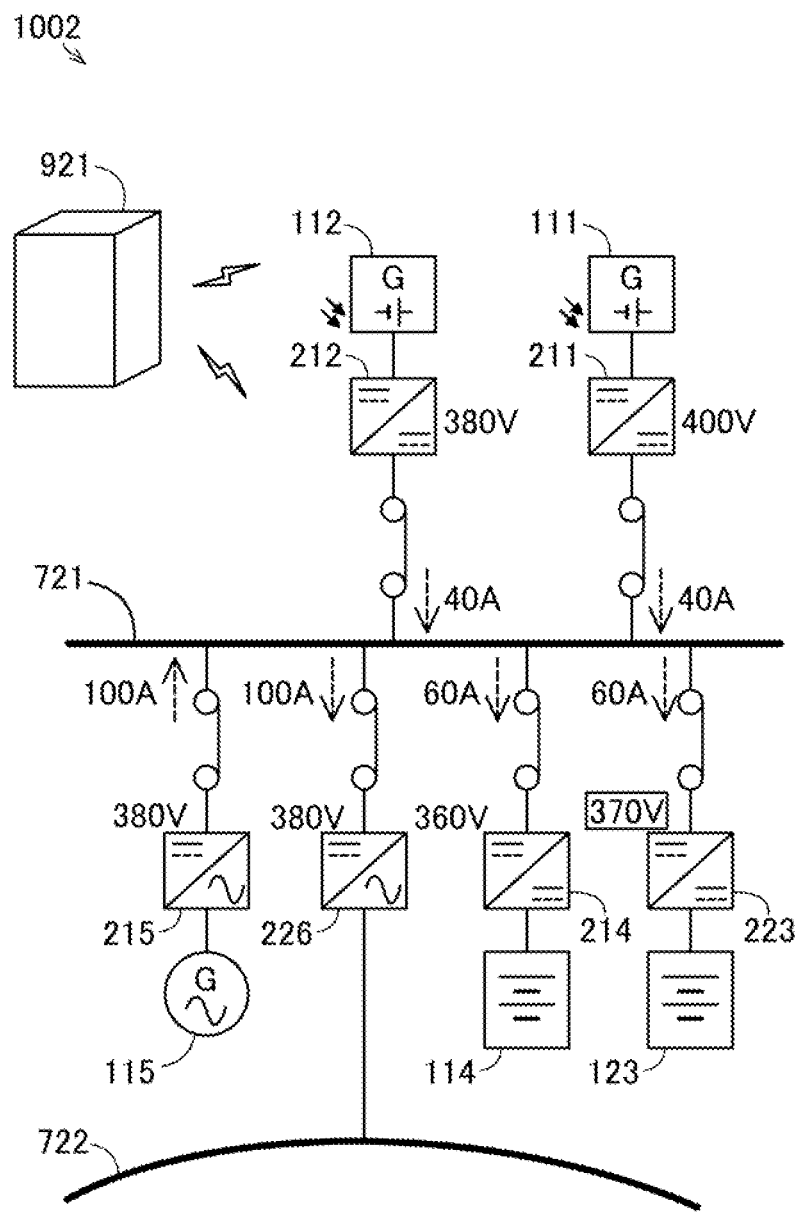
FIG. 6 is an explanatory diagram illustrating the power supply system with part of set voltages changed from the state of FIG. 5.

FIG. 6 is an explanatory diagram illustrating the power supply system 1002 with part of the set voltages changed from the state of FIG. 5. In the state of FIG. 6, the set voltage of the DC-DC converter 223 connected with the storage battery for hospital use 123 is decreased from 380 V to 370 V. As a result, the set voltage (370 V) of the DC-DC converter 223 connected with the storage battery for hospital use 123 is lower than the DC-side set voltage (380 V) of the DC-AC inverter 226 connected with the AC power line 722. The storage battery for hospital use 123 accordingly does not compete with the AC power line 722 but is allowed to preferentially receive the supply of DC power. Since the set voltage of the DC-DC converter 223 connected with the storage battery for hospital use 123 is decreased from 380 V to 370 V, however, the electric power received by the storage battery for hospital use 123 is 22.2 kW (=370 V×60 A). As a result, compared with in the state of FIG. 5, the storage battery for hospital use 123 has a power loss of 0.6 kW (=22.8 kW−22.2 kW) to receive the supply of direct current of 60 A from the trunk line 721. For the purpose of certainly having a chance of receiving a supply of electric power, the storage battery for hospital use 123 has no choice but to have a power loss of 0.6 kW to receive the supply of the same DC power.

Figure 7:
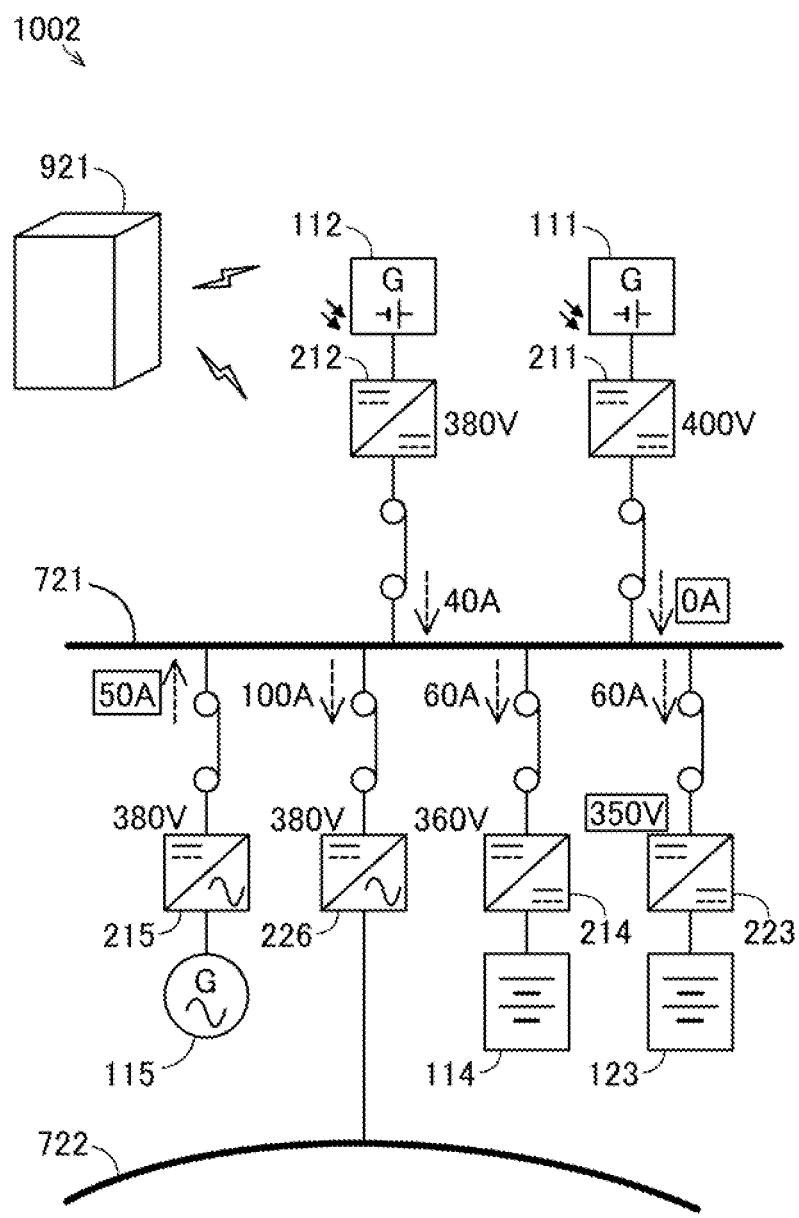
FIG. 7 is an explanatory diagram illustrating the power supply system with part of the set voltages changed in response to a change in the supply state of direct current from the state of FIG. 6.

FIG. 7 is an explanatory diagram illustrating the power supply system 1002 with part of the set voltages changed in response to a change in the supply state of direct current from the state of FIG. 6. In the state o FIG. 7, the electric current supplied from the first solar panel group 111 is changed to 0 A, and the electric current supplied from the gas turbine generator 115 is changed to 50 A. As a result, when the set voltage of the DC-DC converter 223 is kept to 370 V, the storage battery for hospital use 123, which is allowed to receive the supply of DC power of 60 A from the trunk line 721 in the state of FIG. 6, is not allowed to receive the supply of DC power of 60 A. The descending order of priority of the demand-side devices is the storage battery for residential use 114, the storage battery for hospital use 123, and the AC power line 722. Accordingly, the storage battery for residential use 114 receives the supply of DC power of 60 A from the trunk line 721, and the storage battery for hospital use 123 receives the supply of remaining DC power of 30 A from the trunk line 721.

In this state, the set voltage of the DC-DC converter 214 for the storage battery for residential use 114 is 360 V that is the lower limit voltage of the trunk line 721. This fails in an attempt to decrease the set voltage of the DC-DC converter 223 for the storage battery for hospital use 123 to a lower value and raise the priority of the storage battery for hospital use 123 to be higher than the priority of the storage battery for residential use 114, for the purpose of ensuring a chance of receiving a supply of electric power.

The power supply system 1002 of the second embodiment accordingly regards the storage battery for hospital use 123 as a specific demand-side device and specifies the state that the electric current supplied from the first solar panel group 111 is changed to 0 A and that the electric current supplied from the gas turbine generator 115 is decreased, as preset conditions. When the preset conditions are satisfied, the set voltage of the DC-DC converter 223 for the storage battery for hospital use 123 is set to be lower than the lower limit voltage among the set voltages in the other demand-side devices or is set to be lower than the set lower limit voltage of the trunk line 721.

In the state of FIG. 7, the set voltage of the DC-DC converter 223 is changed to 350 V. This satisfies the preset conditions and raises the priority of the storage battery for hospital use 123 to the highest, so as to enable the storage battery for hospital use 123 to preferentially receive a supply of electric power.

When the preset conditions are satisfied, this configuration sets the power-receiving voltage in a specific demand-side device to be lower than the lower limit of the set voltages in the other demand-side devices or to be lower than the set lower limit voltage of the trunk line. This enables the specific demand-side device to preferentially receive a supply of electric power over the other demand-side devices or to exclusively receive a supply of electric power. A facility that needs to preferentially receive a supply of electric power in the case of an emergency, for example, a hospital, a public office, a broadcast station or a communication facility, may be set in advance as the specific demand-side device. This configuration thus enables electric power to be supplied to the specific demand-side device that requires a preferential supply of electric power.

Figure 8:
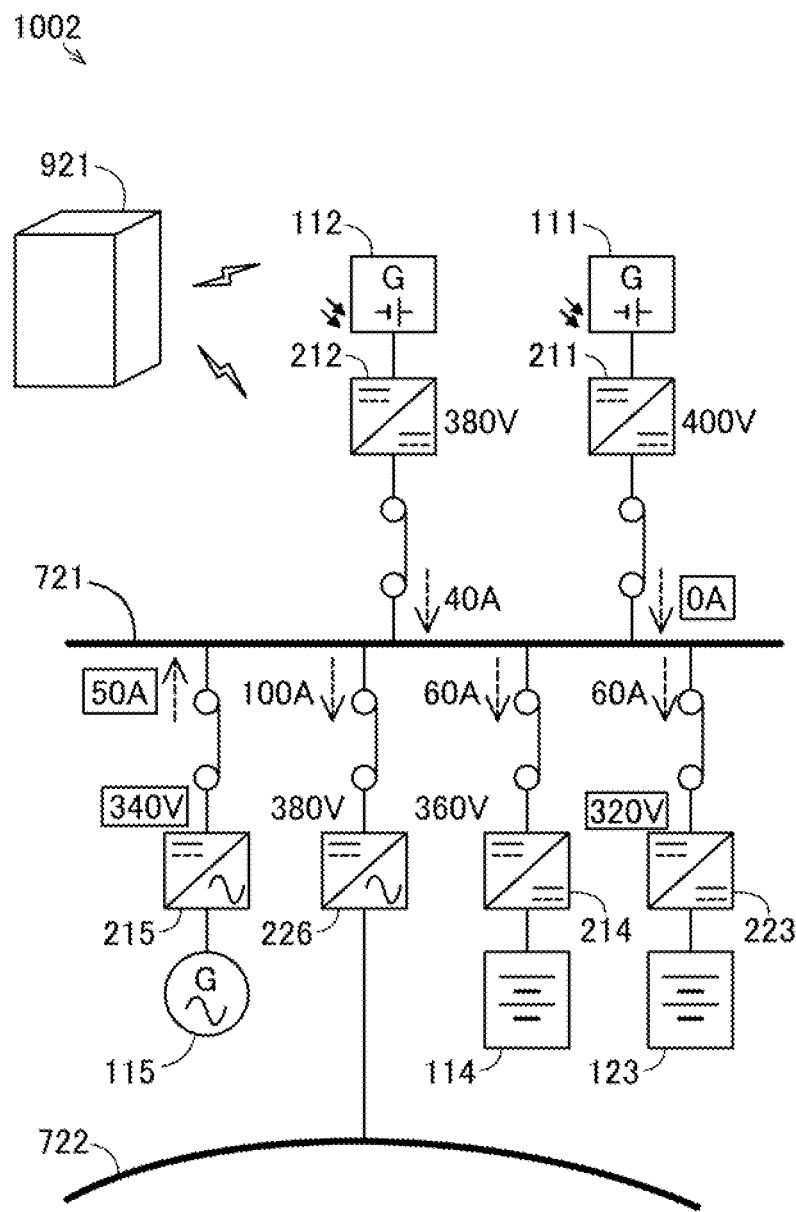
FIG. 8 is an explanatory diagram illustrating the power supply system with part of the set voltages changed in response to a change in the supply state of direct current from the state of FIG. 6.

FIG. 8 is an explanatory diagram illustrating the power supply system 1002 with part of the set voltages changed in response to a change in the supply state of direct current from the state of FIG. 6. In the state o FIG. 8, the electric current supplied from the first solar panel group 111 is changed to 0 A, and the electric current supplied from the gas turbine generator 115 is changed to 50 A. As a result, when the set voltage of the DC-DC converter 223 is kept to 370 V, the storage battery for hospital use 123, which is allowed to receive the supply of DC power of 60 A from the trunk line 721 in the state of FIG. 6, is not allowed to receive the supply of DC power of 60 A. The descending order of priority of the demand-side devices is the storage battery for residential use 114, the storage battery for hospital use 123, and the AC power line 722. Accordingly, the storage battery for residential use 114 receives the supply of DC power of 60 A from the trunk line 721, and the storage battery for hospital use 123 receives the supply of remaining DC power of 30 A from the trunk line 721.

In this state, the set voltage of the DC-DC converter 214 for the storage battery for residential use 114 is 360 V that is the lower limit voltage of the trunk line 721. This fails in an attempt to decrease the set voltage of the DC-DC converter 223 for the storage battery for hospital use 123 to a lower value and raise the priority of the storage battery for hospital use 123 to be higher than the priority of the storage battery for residential use 114, for the purpose of ensuring a chance of receiving a supply of electric power. The second embodiment accordingly regards the storage battery for hospital use 123 as a specific demand-side device and specifies the state that the electric current supplied from the first solar panel group 111 is changed to 0 A and that the electric current supplied from the gas turbine generator 115 is decreased, as preset conditions. When the preset conditions are satisfied, the power supply system 1002 of the second embodiment sets the set voltage of the DC-DC converter 223 for the storage battery for hospital use 123 and the DC-side set voltage of the AC-DC converter 215 for the gas turbine generator (specific supply-side device) 115 to be lower than the set lower limit voltage of the trunk line 721. In the state of FIG. 8, the set voltage of the DC-DC converter 223 is changed to 320 V, and the DC-side set voltage of the AC-DC converter 215 is changed to 340 V. This enables the storage battery for hospital use 123 to exclusively use the electric power supplied from the gas turbine generator 115 and to receive a supply of required direct current of 60 A.

When the preset conditions are satisfied, this configuration sets the power-receiving voltage in a specific demand-side device and the power-feeding voltage in a specific supply-side device to be lower than the set lower limit voltage of the trunk line. This enables the specific demand-side device to exclusively receive a supply of electric power from the specific supply-side device. This configuration is achieved by controlling only the specific supply-side device and the specific demand-side device without requiring management of the entire power supply system 1002. This accordingly reduces the operation cost. A facility that needs to preferentially receive a supply of electric power in the case of an emergency, for example, a hospital, a public office, a broadcast station or a communication facility, may be set in advance as the specific demand-side device. This configuration thus enables electric power to be supplied to the specific demand-side device that requires an exclusive supply of electric power.

Third Embodiment

Figure 9:
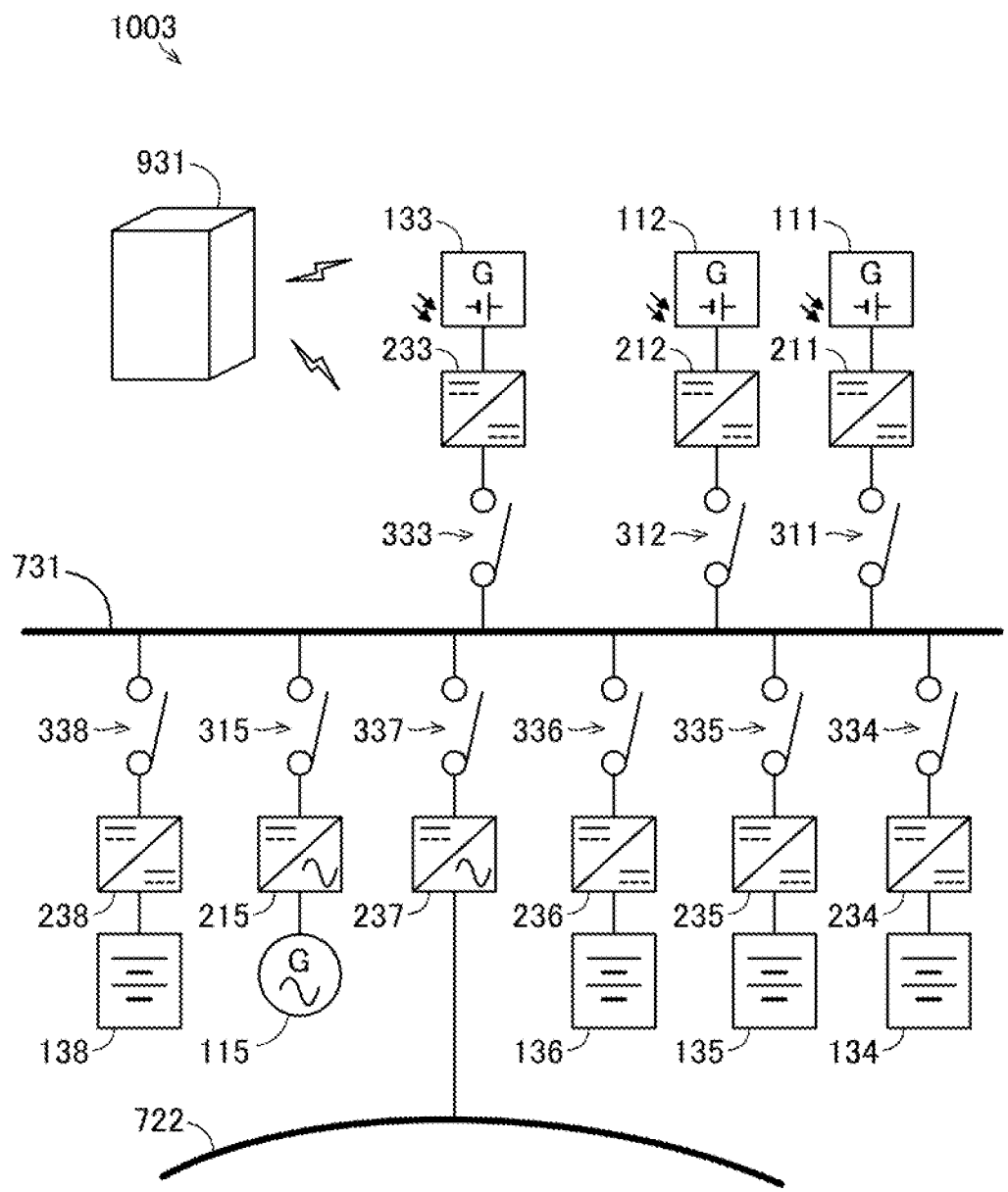
FIG. 9 is a schematic block diagram illustrating a power supply system according to a third embodiment.

FIG. 9 is a schematic block diagram illustrating a power supply system 1003 according to a third embodiment. The power supply system 1003 of the third embodiment includes a first solar panel group (supply-side device) 111; a second solar panel group (supply-side device) 112; a third solar panel group (supply-side device) 133; a DC-DC converter (power feeding-side voltage setting module, supply-side calculator) 211 configured to convert a DC power supplied by the first solar panel group 111; a switch 311 configured to connect and disconnect the DC-DC converter 211 with and from a trunk line 731; a DC-DC converter (power feeding-side voltage setting module, supply-side calculator) 212 configured to convert a DC power supplied by the second solar panel group 112; a switch 312 configured to connect and disconnect the DC-DC converter 212 with and from the trunk line 731; a DC-DC converter (power feeding-side voltage setting module, supply-side calculator) 233 configured to convert a DC power supplied by the third solar panel group 133; a switch 333 configured to connect and disconnect the DC-DC converter 233 with and from the trunk line 731; a first on-board storage battery (supply-side device, demand-side device) 134 mounted on a first electric vehicle; a bidirectional DC-DC converter (power feeding-side voltage setting module, power receiving-side voltage setting module, supply-side calculator, demand-side calculator) 234 configured to convert a DC power supplied from or required by the first on-board storage battery 134; a switch 334 configured to connect and disconnect the bidirectional DC-DC converter 234 with and from the trunk line 731; a second on-board storage battery (supply-side device, demand-side device) 135 mounted on a second electric vehicle; a bidirectional DC-DC converter (power feeding-side voltage setting module, power receiving-side voltage setting module, supply-side calculator, demand-side calculator) 235 configured to convert a DC power supplied from or required by the second on-board storage battery 135; a switch 335 configured to connect and disconnect the bidirectional DC-DC converter 235 with and from the trunk line 731; a third on-board storage battery (supply-side device, demand-side device) 136 mounted on a third electric vehicle; a bidirectional DC-DC converter (power feeding-side voltage setting module, power receiving-side voltage setting module, supply-side calculator, demand-side calculator) 236 configured to convert a DC power supplied from or required by the third on-board storage battery 136; a switch 336 configured to connect and disconnect the bidirectional DC-DC converter 236 with and from the trunk line 731; an AC power line 722 which alternating current flows through; a bidirectional AC-DC converter (power feeding-side voltage setting module, power receiving-side voltage setting module, supply-side calculator, demand-side calculator) 237 configured to convert an AC power supplied from the AC power line 722 into a DC power or to convert a DC power to be supplied to the AC power line 722 into an AC power; a switch 337 configured to connect and disconnect the bidirectional AC-DC converter 237 with and from the trunk line 731; a gas turbine generator (supply-side device) 115 configured to generate an AC power; an AC-DC converter (power feeding-side voltage setting module, supply-side calculator) 215 configured to convert the AC power generated by the gas turbine generator 115 into a DC power; a switch 315 configured to connect and disconnect the AC-DC converter 215 with and from the trunk line 731; a fuel cell (supply-side device) 138 configured to generate electric power by the reaction of hydrogen with oxygen; a DC-DC converter (power feeding-side voltage setting module, supply-side calculator) 238 configured to convert a DC power supplied by the fuel cell 138; a switch 338 configured to connect and disconnect the DC-DC converter 238 with and from the trunk line 731; and a loss calculator 931.

The first on-board storage battery 134, the second on-board storage battery 135, and the third on-board storage battery 136 are configured to repeat power storage and power discharge and serve as both the demand-side device and the supply-side device. The AC power line 722 serves both as a demand-side device to receive a supply of electric power from the trunk line 731 and as a supply-side device to supply electric power to the trunk line 731.

In the power supply system 1003 shown in FIG. 9, it is not necessary to keep the voltage of the trunk line 731 constant. Each of the on-board storage batteries 134, 135 and 136 is thus allowed to arbitrarily set a set voltage in the course of power feeding and supply electric power to the trunk line 731 and is also allowed to arbitrarily set a set voltage in the course of power receiving and receive a supply of electric power from the trunk line 731. The set voltage in each of the on-board storage batteries 134, 135 and 136 may be changed in the course of power feeding or in the course of power receiving or may be blocked by the switch.

In the power supply system 1003 of the third embodiment, a charge amount or a time integration of the current value supplied from the supply-side device or discharged from the supply-side device, as well as a charge amount or a time integration of the current value consumed by the demand-side device or accumulated in the demand-side device is regarded as an amount of power interchange, irrespective of the power-feeding operation or the power-receiving operation. Accordingly, even when the voltage of the trunk line 731 is not kept constant, the amount of power interchange is determinable in the power supply system 1003. In other words, in the power supply system 1003, it is not necessary to keep constant the voltage of the trunk line 731 which direct current flows through, and a charge amount or a time integration of the current value is specified as the amount of power interchange. This configuration accordingly reduces the operation cost of the power supply system 1003 required for power interchange, such as mutual use of power or electricity trading.

Fourth Embodiment

Figure 10:
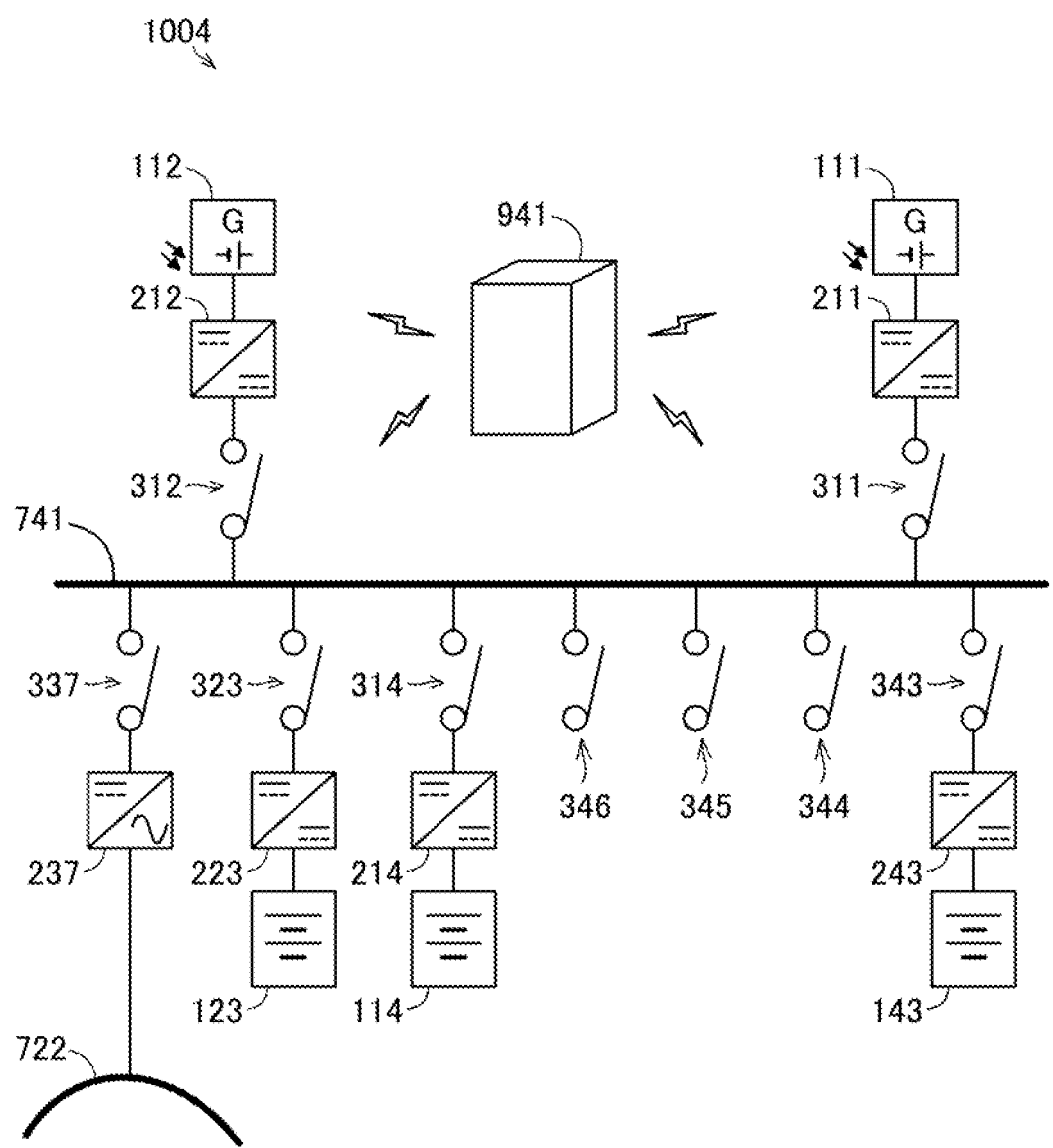
FIG. 10 is a schematic block diagram illustrating a power supply system according to a fourth embodiment.

FIG. 10 is a schematic block diagram illustrating a power supply system 1004 according to a fourth embodiment. The power supply system 1004 of the fourth embodiment includes a first solar panel group (supply-side device) 111; a second solar panel group (supply-side device) 112; a DC-DC converter (power feeding-side voltage setting module, supply-side calculator) 211 configured to convert a DC power supplied by the first solar panel group 111; a switch 311 configured to connect and disconnect the DC-DC converter 211 with and from a trunk line 741; a DC-DC converter (power feeding-side voltage setting module, supply-side calculator) 212 configured to convert a DC power supplied by the second solar panel group 112; a switch 312 configured to connect and disconnect the DC-DC converter 212 with and from the trunk line 741; a storage battery for residential use (demand-side device) 114; a DC-DC converter (power receiving-side voltage setting module, demand-side calculator) 214 configured to convert a DC power that is to be supplied to the storage battery for residential use 114; a switch 314 configured to connect and disconnect the DC-DC converter 214 with and from the trunk line 741; a storage battery for hospital use (demand-side device) 123; a DC-DC converter (power receiving-side voltage setting module, demand-side calculator) 223 configured to convert a DC power that is to be supplied to the storage battery for hospital use 123; a switch 323 configured to connect and disconnect the DC-DC converter 223 with and from the trunk line 741; an AD power line 722; a bidirectional AC-DC converter (power feeding-side voltage setting module, power receiving-side voltage setting module, supply-side calculator, demand-side calculator) 237 configured to convert an AC power supplied from the AC power line 722 into a DC power or to convert a DC power to be supplied to the AC power line 722 into an AC power; a switch 337 configured to connect and disconnect the bidirectional AC-DC converter 237 with and from the trunk line 741; a bidirectional DC-DC converter (power feeding-side voltage setting module, power receiving-side voltage setting module, supply-side calculator, demand-side calculator) 243 configured to convert a DC power supplied or received between an on-board storage battery (supply-side device, demand-side device) 143 mounted on a non-illustrated vehicle and the trunk line 741; a switch 343 configured to connect and disconnect the bidirectional DC-DC converter 243 with and from the trunk line 741; switches 344 to 346 connected with neither the demand-side device nor the supply-side device; and a loss calculator 941.

As shown in FIG. 10, the on-board storage battery 143 supplies or receives a DC power to or from the trunk line 741 via the switch 343 connected with the on-board storage battery 143. The on-board storage battery 143 may be moved along with the vehicle having the on-board storage battery 143 mounted thereon, and may be connected with any of the switches 344 to 346 to change the point of connection with the trunk line 741 and to supply or receive a DC power to and from the trunk line 741 via the connected switch. Accordingly, each of the switches 343 to 346 serves as a device for charging or discharging the on-board storage battery 143.

According to the fourth embodiment, the on-board storage battery 143 is provide with a device mounted to manage the amount of dischargeable electric power or accumulable electric power. The bidirectional DC-DC converter 243 sets a trunk line 741-side voltage in the process of supplying or receiving a DC power to or from the trunk line 741. At least one of the on-board storage battery 143 and the bidirectional DC-DC converter 243 manages a time integration of the current value or a charge amount accompanied with power interchange with the trunk line 741.

According to the fourth embodiment, the on-board storage battery 143 is allowed to supply or receive a DC power to and from the trunk line 741 at any time and at any location where the on-board storage battery 143 is connectable with any of the switches 344 to 346. The amount of power interchange with respect to the on-board storage battery 143 is calculated from a time integration of the direct current or a charge amount. The amount of power interchange is thus calculable even when the voltage of the trunk line 741 is not kept constant. Whether the on-board storage battery 143 supplies or receives electric power at any location other than a preset location or supplies or receives electric power at any time other than a preset specific time, the amount of power interchange is determined according to a time integration of the direct current or a charge amount supplied or received between the on-board storage battery 143 and the trunk line 741. The power supply system 1004 of the fourth embodiment is thus allowed to calculate the amount of power interchange to and from the on-board storage battery 143, without requiring any device for managing the entire power supply system 1006 described in the comparative example. This configuration accordingly reduces the operation cost of the power supply system 1004 required for power interchange, such as mutual use of power or electricity trading.

Fifth Embodiment

Figure 11:
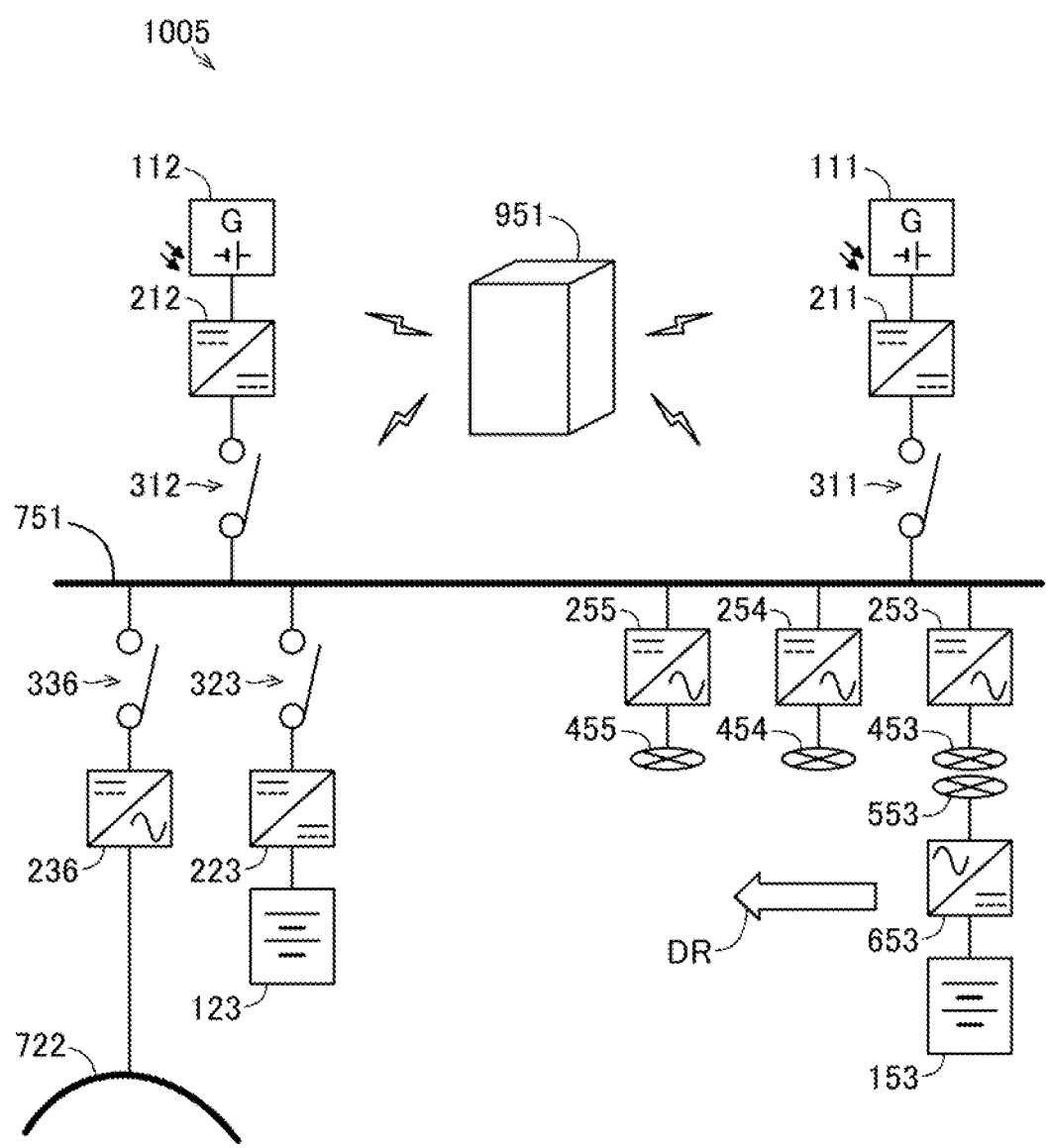
FIG. 11 is a schematic block diagram illustrating a power supply system according to a fifth embodiment.

FIG. 11 is a schematic block diagram illustrating a power supply system 1005 according to a fifth embodiment. The power supply system 1005 of the fifth embodiment differs from the power supply system 1004 of the fourth embodiment by the following two points:

The power supply system 1005 is not provided with the storage battery for residential use 114, the DC-DC converter 214, or the switch 314; and The power supply system 1005 is provided with an on-board storage battery (supply-side device, demand-side device) 153, a bidirectional AC-DC converter 653, non-contact power-receiving and power-feeding devices 453 to 455 and 553 and bidirectional AC-DC converters 253 to 255, in place of the on-board storage battery 143, the bidirectional DC-DC converter 243 and the switches 343 to 346.

The fifth embodiment describes the configuration, the control and the like different from those of the power supply system 1004 of the fourth embodiment, while omitting the description of the configuration, the control and the like identical with those of the fourth embodiment.

As shown in FIG. 11, the power supply system 1005 includes an on-board storage battery 153 mounted on a vehicle; a bidirectional AC-DC converter (power feeding-side voltage setting module, power receiving-side voltage setting module, supply-side calculator, demand-side calculator) configured to convert a DC power into an AC power in the case of receiving electric power from a trunk line 751 into the on-board storage battery 153 or to convert an AC power into a DC power in the case of supplying electric power from the on-board storage battery 153 to the trunk line 751; non-contact power-receiving and power-feeding devices 453 and 553 configured to receive electric power and supply electric power in a non-contact manner; a bidirectional AC-DC converter 653 configured to convert a DC power into an AC power, which is to be supplied via the non-contact power-receiving and power-feeding devices, and supply the AC power from the on-board storage battery 153 or to convert an AC power, which is required via the non-contact power-receiving and power-feeding devices, into a DC power and require the on-board storage battery 153 to supply the DC power; bidirectional AC-DC converters 254 and 255 connected with the trunk line 751; and non-contact power-receiving and power-feeding devices 454 and 455 respectively connected with bidirectional AC-DC converters 254 and 255.

In the state of FIG. 11, the on-board storage battery 153 supplies and receives the DC power to and from the trunk line 751 via the non-contact power-receiving and power-feeding devices 453 and 553. The vehicle with the on-board storage battery 153 mounted thereon moves along an arrow DR shown in FIG. 11. When the vehicle moves, the non-contact power-receiving and power-feeding device 553 connected with the on-board storage battery 153 by wire moves to be not opposed to the non-contact power-receiving and power-feeding device 453 but to be opposed to the non-contact power-receiving and power-feeding device 454. At this position, the on-board storage battery 153 supplies and receives the DC power to and from the trunk line 751 via the non-contact power-receiving and power-feeding device 454. The vehicle with the on-board storage battery 153 mounted thereon may be stopped at any position that is opposed to or not opposed to, for example, the non-contact power-receiving and power-feeding device 454. The supply of electric power with regard to the on-board storage battery 153 may be controlled by opening and closing control of a switch that is not shown in FIG. 11. Accordingly, the on-board storage battery 153 of the fifth embodiment is allowed to supply and receive the DC power to and from the trunk line 751 when the non-contact power-receiving and power-feeding device 553 connected with the on-board storage battery 153 is opposed to any of the non-contact power-receiving and power-feeding devices 453 to 455. In general, in the case of non-contact power receiving or power feeding, the voltage generated in the non-contact power-receiving and power-feeding device is significantly changed according to the power demand and supply conditions. A complicated measuring instrument is thus required to determine the amount of supplied electric power or the amount of received electric power. In the power supply system 1005 of the fifth embodiment, on the other hand, the amount of power interchange with regard to the on-board storage battery 153 is calculable from a time integration of the current value or a charge amount. The time integration of the current value or the charge amount is calculable by a simple device and is also calculable even when the voltage of the trunk line 751 is not kept constant. The power supply system 1005 of the fifth embodiment is thus allowed to calculate the amount of power interchange to and from the on-board storage battery 153, without requiring any device for managing the entire power supply system 1006 described in the comparative example. This configuration accordingly reduces the operation cost of the power supply system 1005 required for power interchange, such as mutual use of power or electricity trading.

Modifications of Embodiments

The present disclosure is not limited to the embodiments described above but may be implemented by a variety of other aspects without departing from the scope of the disclosure. Some examples of possible modification are given below.

[Modification 1]

The power supply systems 1001 to 1005 of the first embodiment to the fifth embodiment described above are only illustrative, and the configuration and the various controls in any of the power supply systems 1001 to 1005 may be changed or modified in various ways. The power supply system is required to include a trunk line which direct current flows through; a supply-side device connected with the trunk line to supply a DC power to the trunk line; and a demand-side device connected with the trunk line to receive a supply of DC power from the trunk line. The power supply system may be modified in such a range as to satisfy the following three conditions:

The power-feeding voltage of the supply-side device is set on the supply side;

The power-receiving voltage of the demand-side device is set on the demand side; and A charge amount or a time integration of current value supplied from the supply-side device to a DC power trunk line, as well as a charge amount or a time integration of current value supplied from the DC power trunk line to the demand-side device is regarded as an amount of power interchange.

The power supply system 1001 of the first embodiment described above is provided with a plurality of demand-side devices and a plurality of supply-side devices. The power supply system is, however, required to include at least one demand-side device and at least one supply-side device. For example, the power supply system 1001 may be provided only with the gas turbine generator 115 configured to supply electric power to the trunk line 711 and with the on-board storage battery 113.

[Modification 2]

The on-board storage battery 143 of the fourth embodiment may be provided with a control device. This control device may be configured to manage an expected amount of power interchange receivable from the trunk line 741 or suppliable to the trunk line 741, a time of power interchange, as well as an actual amount of power interchange actually received from or actually supplied to the trunk line 741. The control device may manage additional factors other than these three factors or may not manage any part of these three factors. For example, the control device for the on-board storage battery 143 may manage only the expected amount of power interchange suppliable to the trunk line 741, as the electric power accumulated in the on-board storage battery 143.

According to the embodiments described above, the amount of power interchange supplied from or received into the on-board storage battery is determined from the time integration of direct current. There is accordingly no need to connect the on-board storage battery with any specific position in the trunk line at any specific time for the purpose of supplying or receiving the DC power to or from the on-board storage battery. The on-board storage battery is free from the restrictions of, for example, a virtual power plant VPP configured to supply or receive electric power in the power supply system 1006 of the comparative example, which alternating current flows through. This simplifies the configuration of the power supply system and reduces the operation cost of the power supply system required for power interchange, such as mutual use of power or electricity trading.

[Modification 3]

The loss calculator 921 of the second embodiment described above calculates the difference between the total electric power supplied by all the supply-side devices connected with the trunk line 721 and the total electric power received by all the demand-side devices connected with the trunk line 721, as the power loss of the power supply system 1002. The method of calculating the power loss may, however, be modified in various ways. For example, the loss calculator 921 may calculate a difference between a total charge amount supplied by all the supply-side devices and a total charge amount received by all the demand-side devices, as the power loss of the power supply system 1002. Any known technique may be employed for calculation of the power loss. A loss calculator having a different configuration from that of the loss calculator 921 may calculate a power loss of the power supply system 1002.

The configuration of the second embodiment sets the upper limit voltage and the lower limit voltage of the trunk line 721 and sets the trunk line 721-side DC power voltages of the DC-DC converter 223, the DC-DC converter 214 and the DC-AC converter 226 respectively connected with the storage battery for hospital use 123, the storage battery for residential use 114, and the AC power line 722. The set voltage of the DC-DC converter 223 connected with the storage battery for hospital use 123 changes the set voltage to a lower voltage when a DC power of not lower than a predetermined current value as the preset condition is not suppliable to the storage battery for hospital use 123. The method of controlling the set voltage may be modified in various ways.

According to the second embodiment, the set voltage of the DC-DC converter 223 connected with the storage battery for hospital use 123 may be a non-changed voltage in a predetermined range, irrespective of satisfaction or non-satisfaction of the preset conditions. The preset conditions may be modified in various ways. For example, the preset condition may depend on whether the amount of power interchange or the charge amount already received by the storage battery for hospital use 123 is equal to or higher than a predetermined value or is lower than the predetermined value. According to the first embodiment described above, the DC-DC converter or the like serves to set the set voltage of the DC power that is to be supplied to the demand-side device connected with the DC-DC converter or the like or to set the set voltage of the DC power supplied from the supply-side device. Another device may, however, control the set voltage.

The on-board storage battery 143 of the fourth embodiment (shown in FIG. 10) is moved along with the vehicle having the on-board storage battery 143 mounted thereon to change the point of connection with the trunk line 741 via any of the switches 343 to 346. The point of connection may, however, be necessarily changeable, like the demand-side devices of the first embodiment to the third embodiment. The demand-side device allowed to change the point of connection is not necessarily limited to the on-board storage battery 143 or 153. For example, a connecting cable of the storage battery for residential use 114 according to the first embodiment may be connected with a different point via an extension. Instead of the demand-side device, a supply-side device, for example, a solar panel mounted on a vehicle roof, may be configured to change a point of connection with the trunk line 741.

The configuration of the above aspect may be implemented by the configuration of an aspect described below.

There is provided a power supply system configured such that electric power is supplied from a supply-side device that is connected with a DC power trunk line to output a DC power to a demand-side device that is connected with the DC power trunk line to receive a DC power. This power supply system comprises a power feeding-side voltage setting module configured to set a power-feeding voltage when the supply-side device supplies a DC power to the DC power trunk line; a supply-side calculator configured to calculate either one of a time integration of direct current supplied from the supply-side device to the DC power trunk line and a charge amount supplied from the supply-side device to the DC power trunk line, as an amount of power interchange from the supply-side device to the DC power trunk line; a power receiving-side voltage setting module configured to set a power-receiving voltage when the demand-side device receives a DC power from the DC power trunk line; and a demand-side calculator configured to calculate either one of a time integration of direct current supplied from the DC power trunk line to the demand-side device and a charge amount supplied from the DC power trunk line to the demand-side device, as an amount of power interchange from the DC power trunk line to the demand-side device.

The aspects of the present disclosure are described above, based on the embodiments and the modifications. The embodiments and the modifications described above are, however, presented to facilitate understanding of the present disclosure and are not at all intended to limit the present disclosure. The aspects of the present disclosure may be changed, altered, modified or improved without departing from the subject matter or the scope of the present disclosure and include equivalents thereof. Furthermore, any of the technical features may be omitted appropriately unless it is described as essential in the description hereof.

What is claimed is:

1. A voltage setting system for power distribution comprising:
   a DC power trunk line;
   a demand-side device;

a supply-side device that is configured to supply electric power and that is connected with the DC power trunk line to output a DC power to the demand-side device that is connected with the DC power trunk line to receive a DC power;
a power feeding-side voltage setting module that sets a power-feeding voltage of the supply-side device on a supply side;
a power receiving-side voltage setting module that sets a power-receiving voltage of the demand-side device on a demand side;
a supply-side calculator that is configured to:
　calculate a time integration of current value supplied from the supply-side device to the DC power trunk line as an amount of power interchange; and
a demand-side calculator that is configured to:
　calculate a time integration of current value supplied from the DC power trunk line to the demand-side device as an amount of power interchange.

2. The voltage setting system for power distribution according to claim 1,
the power feeding-side voltage setting module or the power receiving-side voltage setting module sets an upper limit voltage of the DC power trunk line that is higher than a time average voltage by 5% or more and a lower limit voltage of the DC power trunk line that is lower than the time average voltage by 5% or more.

3. The voltage setting system for power distribution according to claim 1, wherein:
the supply-side device includes a plurality of supply-side devices;
the demand-side device includes a plurality of demand-side devices; and
the power feeding-side voltage setting module or the power receiving-side voltage setting module changes a point of connection of part of the plurality of supply-side devices or part of the plurality of demand-side devices with the DC power trunk line or to move the point of connection during power interchange.

4. The voltage setting system for power distribution according to claim 1, wherein:
the supply-side device includes a plurality of supply-side devices;
the demand-side device includes a plurality of demand-side devices;
at least one supply-side device of the plurality of supply-side devices is configured to start, stop or change supplying DC power to the DC power trunk line, irrespective of conditions of the other supply-side devices of the plurality of supply-side devices and the plurality of demand-side devices; and
at least one demand-side device of the plurality of demand-side devices is configured to start, stop or change receiving a supply of DC power from the DC power trunk line, irrespective of conditions of the plurality of supply-side devices and the other demand-side devices of the plurality of demand-side devices.

5. The voltage setting system for power distribution according to claim 1, further comprising:
a power manager configured to manage:
　an amount of power interchange suppliable from the supply-side device to the DC power trunk line;
　a time or a time period at or for which DC power is suppliable from the supply-side device to the DC power trunk line;
　an amount of power interchange actually supplied from the supply-side device to the DC power trunk line;
　an amount of power interchange receivable from the DC power trunk line to the demand-side device;
　a time or a time period at or for which the demand-side device requires a supply of DC power from the DC power trunk line; and
　an amount of power interchange actually supplied from the DC power trunk line to the demand-side device.

6. The voltage setting system for power distribution according to claim 1, further comprising:
a loss calculator configured to calculate a power loss in the voltage setting system for power distribution, wherein:
　the supply-side device includes a plurality of supply-side devices connected with the DC power trunk line;
　the demand-side device includes a plurality of demand-side devices connected with the DC power trunk line; and
　the loss calculator calculates a difference between a total power supplied from all of the plurality of supply-side devices connected with the DC power trunk line and a total power supplied to all of the plurality of demand-side devices connected with the DC power trunk line, as the power loss in the voltage setting system for power distribution.

7. The voltage setting system for power distribution according to claim 1, wherein:
the demand-side device includes a plurality of demand-side devices connected with the DC power trunk line;
each of the plurality of demand-side devices is provided with the power receiving-side voltage setting module configured to set a set voltage in the demand-side device that receives DC power from the DC power trunk line;
the power receiving-side voltage setting module sets the set voltage in the demand-side device in a range of a preset lower limit to a preset upper limit; and
when a preset condition is satisfied, the power receiving-side voltage setting module of at least one specific demand-side device, among the plurality of demand-side devices connected with the DC power trunk line, sets the set voltage in the specific demand-side device to be lower than the lower limit of the set voltages in the other demand-side devices of the plurality of demand-side devices.

8. The voltage setting system for power distribution according to claim 1, wherein:
the demand-side device includes a plurality of demand-side devices connected with the DC power trunk line;
each of the plurality of demand-side devices is provided with the power receiving-side voltage setting module configured to set a set voltage in the demand-side device that receives DC power from the DC power trunk line;
the power receiving-side voltage setting module sets a voltage of the DC power trunk line to be higher than a predetermined lower limit voltage;
the power receiving-side voltage setting module sets the set voltage in a range of a preset lower limit to a preset upper limit; and
when a preset condition is satisfied, the power receiving-side voltage setting module of at least one specific demand-side device, among the plurality of demand-side devices connected with the DC power trunk line, sets the set voltage in the specific demand-side device to be lower than the predetermined lower limit voltage of the DC power trunk line which the specific demand-side device is connected with.

9. The voltage setting system for power distribution according to claim 7, wherein:
the supply-side device includes a plurality of supply-side devices connected with the DC power trunk line;
the demand-side device includes a plurality of demand-side devices connected with the DC power trunk line;
each of the plurality of supply-side devices is provided with the power feeding-side voltage setting module configured to set a set voltage in the supply-side device that supplies DC power to the DC power trunk line;
each of the plurality of demand-side devices is provided with the power receiving-side voltage setting module configured to set a set voltage in the demand-side device that receives DC power from the DC power trunk line;
the power feeding-side voltage setting module sets the set voltage in the supply-side device in a range of a preset lower limit to a preset upper limit;
the power receiving-side voltage setting module sets the set voltage in the demand-side device in a range of a preset lower limit to a preset upper limit; and
when a preset condition is satisfied, the power feeding-side voltage setting module of at least one specific supply-side device, among the plurality of supply-side devices connected with the DC power trunk line and the power receiving-side voltage setting module of at least one specific demand-side device, among the plurality of demand-side devices connected with the DC power trunk line, respectively set the set voltage in the specific supply-side device and the set voltage in the specific demand-side device to be lower than the lower limit of the set voltages in the other demand-side devices of the plurality of demand-side devices.

10. The voltage setting system for power distribution according to claim 7, wherein:
the supply-side device includes a plurality of supply-side devices connected with the DC power trunk line;
the demand-side device includes a plurality of demand-side devices connected with the DC power trunk line;
the power feeding-side voltage setting module sets a voltage of the DC power trunk line to be higher than a predetermined lower limit voltage;
each of the plurality of supply-side devices is provided with the power feeding-side voltage setting module configured to set a set voltage in the supply-side device that supplies DC power to the DC power trunk line;
each of the plurality of demand-side devices is provided with the power receiving-side voltage setting module configured to set a set voltage in the demand-side device that receives DC power from the DC power trunk line;
the power feeding-side voltage setting module sets the set voltage in the supply-side device in a range of a preset lower limit to a preset upper limit;
the power receiving-side voltage setting module sets the set voltage in the demand-side device in a range of a preset lower limit to a preset upper limit; and
when a preset condition is satisfied, the power feeding-side voltage setting module of at least one specific supply-side device, among the plurality of supply-side devices connected with the DC power trunk line and the power receiving-side voltage setting module of at least one specific demand-side device, among the plurality of demand-side devices connected with the DC power trunk line, respectively set the set voltage in the specific supply-side device and the set voltage in the specific demand-side device to be lower than the predetermined lower limit voltage of the DC power trunk line.

11. The voltage setting system for power distribution according to claim 2, further comprising:
the supply-side devices include a plurality of supply-side devices;
the demand-side device includes a plurality of demand-side devices; and
the power feeding-side voltage setting module or the power receiving-side voltage setting module changes a point of connection of part of the plurality of supply-side devices or part of the plurality of demand-side devices with the DC power trunk line or to move the point of connection during power interchange.

12. The voltage setting system for power distribution according to claim 2, further comprising:
the supply-side devices include a plurality of supply-side devices;
the demand-side device includes a plurality of demand-side devices;
at least one supply-side device of the plurality of supply-side devices is configured to start, stop or change supplying DC power to the DC power trunk line, irrespective of conditions of the other supply-side devices of the plurality of supply-side devices and the plurality of demand-side devices; and
at least one demand-side device of the plurality of demand-side devices is configured to start, stop or change receiving a supply of DC power from the DC power trunk line, irrespective of conditions of the plurality of supply-side devices and the other demand-side devices of the plurality of demand-side devices.

13. The voltage setting system for power distribution according to claim 2, further comprising:
a power manager configured to manage:
an amount of power interchange suppliable from the supply-side device to the DC power trunk line;
a time or a time period at or for which DC power is suppliable from the supply-side device to the DC power trunk line;
an amount of power interchange actually supplied from the supply-side device to the DC power trunk line;
an amount of power interchange receivable from the DC power trunk line to the demand-side device;
a time or a time period at or for which the demand-side device requires a supply of DC power from the DC power trunk line; and
an amount of power interchange actually supplied from the DC power trunk line to the demand-side device.

14. The voltage setting system for power distribution according to claim 2, further comprising:
a loss calculator configured to calculate a power loss in the voltage setting system for power distribution, wherein:
the supply-side device includes a plurality of supply-side devices connected with the DC power trunk line;
the demand-side devices includes a plurality of demand-side devices connected with the DC power trunk line; and
the loss calculator calculates a difference between a total power supplied from all the plurality of supply-side devices connected with the DC power trunk line and a total power supplied to all the plurality of demand-side devices connected with the DC power trunk line, as the power loss in the voltage setting system for power distribution.

15. The voltage setting system for power distribution according to claim 2, wherein:
the demand-side devices include a plurality of demand-side devices connected with the DC power trunk line;
each of the plurality of demand-side devices is provided with the power receiving-side voltage setting module configured to set a set voltage in the demand-side device that receives DC power from the DC power trunk line;
the power receiving-side voltage setting module sets the set voltage in the demand-side device in a range of a preset lower limit to a preset upper limit; and
when a preset condition is satisfied, the power receiving-side voltage setting module of at least one specific demand-side device, among the plurality of demand-side devices connected with the DC power trunk line, sets the set voltage in the specific demand-side device to be lower than the lower limit of the set voltages in the other demand-side devices of the plurality of demand-side devices.

16. The voltage setting system for power distribution according to claim 2, wherein:
the demand-side devices a plurality of demand-side devices connected with the DC power trunk line;
each of the plurality of demand-side devices is provided with the power receiving-side voltage setting module configured to set a set voltage in the demand-side device that receives DC power from the DC power trunk line;
the power receiving-side voltage setting module sets a voltage of the DC power trunk line to be higher than a predetermined lower limit voltage;
the power receiving-side voltage setting module sets the set voltage in a range of a preset lower limit to a preset upper limit; and when a preset condition is satisfied, the power receiving-side voltage setting module of at least one specific demand-side device, among the plurality of demand-side devices connected with the DC power trunk line, sets the set voltage in the specific demand-side device to be lower than the predetermined lower limit voltage of the DC power trunk line which the specific demand-side device is connected with.

17. The voltage setting system for power distribution according to claim 15, wherein:
the supply-side device includes a plurality of supply-side devices connected with the DC power trunk line;
the demand-side devices include a plurality of demand-side devices connected with the DC power trunk line;
each of the plurality supply-side devices is provided with the power feeding-side voltage setting module configured to set a set voltage in the supply-side device that supplies DC power to the DC power trunk line;
each of the plurality of demand-side devices is provided with the power receiving-side voltage setting module configured to set a set voltage in the demand-side device that receives DC power from the DC power trunk line;
the power feeding-side voltage setting module sets the set voltage in the supply-side device in a range of a preset lower limit to a preset upper limit;
the power receiving-side voltage setting module sets the set voltage in the demand-side device in a range of a preset lower limit to a preset upper limit; and
when a preset condition is satisfied, the power feeding-side voltage setting module of at least one specific supply-side device, among the plurality of supply-side devices connected with the DC power trunk line and the power receiving-side voltage setting module of at least one specific demand-side device, among the plurality of demand-side devices connected with the DC power trunk line, respectively set the set voltage in the specific supply-side device and the set voltage in the specific demand-side device to be lower than the lower limit of the set voltages in the other demand-side devices of the plurality of demand-side devices.

18. The voltage setting system for power distribution according to claim 15, wherein:
the supply-side device includes a plurality of supply-side devices connected with the DC power trunk line;
the demand-side devices include a plurality of demand-side devices connected with the DC power trunk line;
the power feeding-side voltage setting module sets a voltage of the DC power trunk line to be higher than a predetermined lower limit voltage;
each of the plurality of supply-side devices is provided with the power feeding-side voltage setting module configured to set a set voltage in the supply-side device that supplies DC power to the DC power trunk line;
each of the plurality of demand-side devices is provided with the power receiving-side voltage setting module configured to set a set voltage in the demand-side device that receives DC power from the DC power trunk line;
the power feeding-side voltage setting module sets the set voltage in the supply-side device in a range of a preset lower limit to a preset upper limit;
the power receiving-side voltage setting module sets the set voltage in the demand-side device in a range of a preset lower limit to a preset upper limit; and
when a preset condition is satisfied, the power feeding-side voltage setting module of at least one specific supply-side device, among the plurality of supply-side devices connected with the DC power trunk line and the power receiving-side voltage setting module of at least one specific demand-side device, among the plurality of demand-side devices connected with the DC power trunk line, respectively set the set voltage in the specific supply-side device and the set voltage in the specific demand-side device to be lower than the predetermined lower limit voltage of the DC power trunk line.

19. The voltage setting system for power distribution according to claim 3, wherein:
the supply-side device includes a plurality of supply-side devices;
the demand-side device includes a plurality of demand-side devices;
at least one supply-side device of the plurality of supply-side devices is configured to start, stop or change supplying DC power to the DC power trunk line, irrespective of conditions of the other supply-side devices of the plurality of supply-side devices and the plurality of demand-side devices; and
at least one demand-side device of the plurality of demand-side devices is configured to start, stop or change receiving a supply of DC power from the DC power trunk line, irrespective of conditions of the plurality of supply-side devices and the other demand-side devices of the plurality of demand-side devices.

20. The voltage setting system for power distribution according to claim 3, further comprising:
a power manager configured to manage:

an amount of power interchange suppliable from the supply-side device to the DC power trunk line;

a time or a time period at or for which DC power is suppliable from the supply-side device to the DC power trunk line;

an amount of power interchange actually supplied from the supply-side device to the DC power trunk line;

an amount of power interchange receivable from the DC power trunk line to the demand-side device;

a time or a time period at or for which the demand-side device requires a supply of DC power from the DC power trunk line; and an amount of power interchange actually supplied from the DC power trunk line to the demand-side device.

* * * * *